(12) United States Patent
Ickes et al.

(10) Patent No.: US 10,601,783 B2
(45) Date of Patent: Mar. 24, 2020

(54) SYSTEM AND METHOD FOR DIGITAL PAYLOAD INSPECTION

(71) Applicant: Mycroft Secured Computing, Corp., Oley, PA (US)

(72) Inventors: Peter D Ickes, Belmont, MA (US); Stuart A Salen, Oley, PA (US); Joseph A. Vitka, III, Amesbury, MA (US)

(73) Assignee: MyCroft Secure Computing Corp., Oley, PA (US)

( * ) Notice: Subject to any disclaimer, the term of this patent is extended or adjusted under 35 U.S.C. 154(b) by 153 days.

(21) Appl. No.: 15/496,736

(22) Filed: Apr. 25, 2017

(65) Prior Publication Data
US 2017/0331790 A1    Nov. 16, 2017

Related U.S. Application Data

(60) Provisional application No. 62/391,883, filed on May 13, 2016.

(51) Int. Cl.
*H04L 29/06* (2006.01)
*G06F 21/56* (2013.01)

(52) U.S. Cl.
CPC ........ *H04L 63/0281* (2013.01); *G06F 21/567* (2013.01); *H04L 63/0245* (2013.01);
(Continued)

(58) Field of Classification Search
CPC ............. H04L 63/0281; H04L 63/0245; H04L 63/1425; H04L 63/145; H04L 63/1416;
(Continued)

(56) References Cited

U.S. PATENT DOCUMENTS 7,685,640 B2 * 3/2010 Azadet .................. G06F 21/564
726/22
8,291,496 B2 * 10/2012 Bennett ............... H04L 63/1416
726/23

(Continued)

FOREIGN PATENT DOCUMENTS

WO    WO-2016054626 A1 * 4/2016

OTHER PUBLICATIONS

J.P. Gourret and J. Paille, Irregular Polygon Fill Using Contour Encoding, 1987, Laboratoire de Traitnnent du Signal Numerique Ecole Nationale Superieure de Physique, Domaine Universitaire de St. Jerome, 13397 Marseille Cedex 13—France, pp. 1-9, 1987.*

(Continued)

*Primary Examiner* — Farid Homayounmehr
*Assistant Examiner* — Raied A Salman
(74) *Attorney, Agent, or Firm* — Peter D. Ickes; Stuart A. Salen; Joesph A. Vitka, III

(57) ABSTRACT

Use of an ancillary proxy server can be used as a man-in-the-middle agent, for example, as part of a firewall system that brackets the inputs and outputs of the payload inspection system, to intercept, collect and store encryption keys and certificates. Possession of these keys and certificates would allow the un-encryption of data streams before processing of the data stream by the payload inspection system. A data stream may be duplicated and held until released by the payload inspection system or re-encrypted after processing by the payload inspection system as needed.

12 Claims, 27 Drawing Sheets

(52) U.S. Cl.
CPC ........ *H04L 63/145* (2013.01); *H04L 63/1425* (2013.01); *H04L 63/0428* (2013.01)

(58) Field of Classification Search
CPC ............. H04L 63/1441; H04L 63/1408; H04L 63/1433; H04L 63/1458; H04L 63/1483; H04L 63/14; G06F 21/567; G06F 21/565; G06F 21/56; G06F 21/566; G06F 21/55
USPC ............. 726/12, 23, 24, 22, 13, 25; 713/188
See application file for complete search history.

(56) References Cited

U.S. PATENT DOCUMENTS

| | | | |
|---|---|---|---|
| 8,381,290 B2 * | 2/2013 | Sheppard ............. | G06F 21/563 |
| | | | 707/E17.042 |
| 9,197,655 B2 | 11/2015 | Hanner, Sr. et al. | |
| 9,411,955 B2 * | 8/2016 | Jakobsson ............... | G06F 21/55 |
| 9,584,490 B2 * | 2/2017 | Maruyama ............. | H04L 9/083 |
| 9,589,147 B2 * | 3/2017 | Hanner, Sr. ......... | H04L 63/0245 |
| 9,596,250 B2 * | 3/2017 | Reddington ........ | H04L 63/1416 |
| 9,942,250 B2 * | 4/2018 | Stiansen ............ | H04L 63/1416 |
| 2016/0098561 A1 * | 4/2016 | Keller ................... | G06F 21/554 |
| | | | 726/24 |
| 2016/0307003 A1 * | 10/2016 | Dai Zovi ............... | G06F 21/36 |

OTHER PUBLICATIONS

Gary C. Kessler, .An Overview of Steganography for the Computer Forensics Examiner, Feb. 2004 (updated Feb. 2015).

* cited by examiner

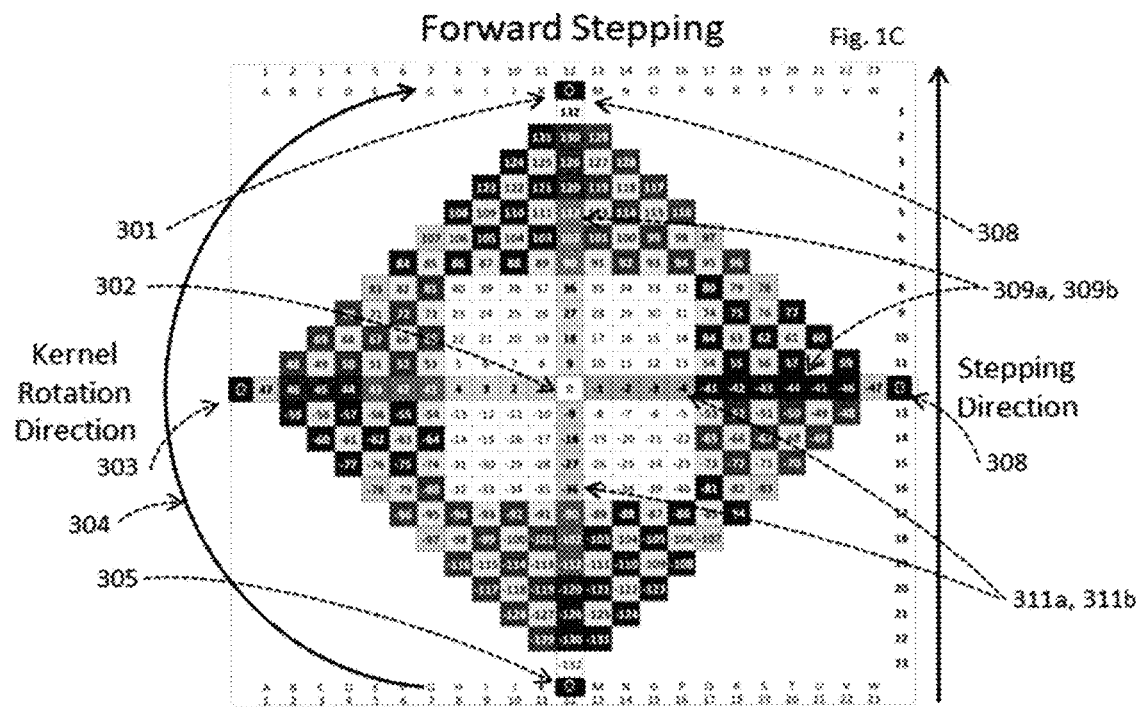
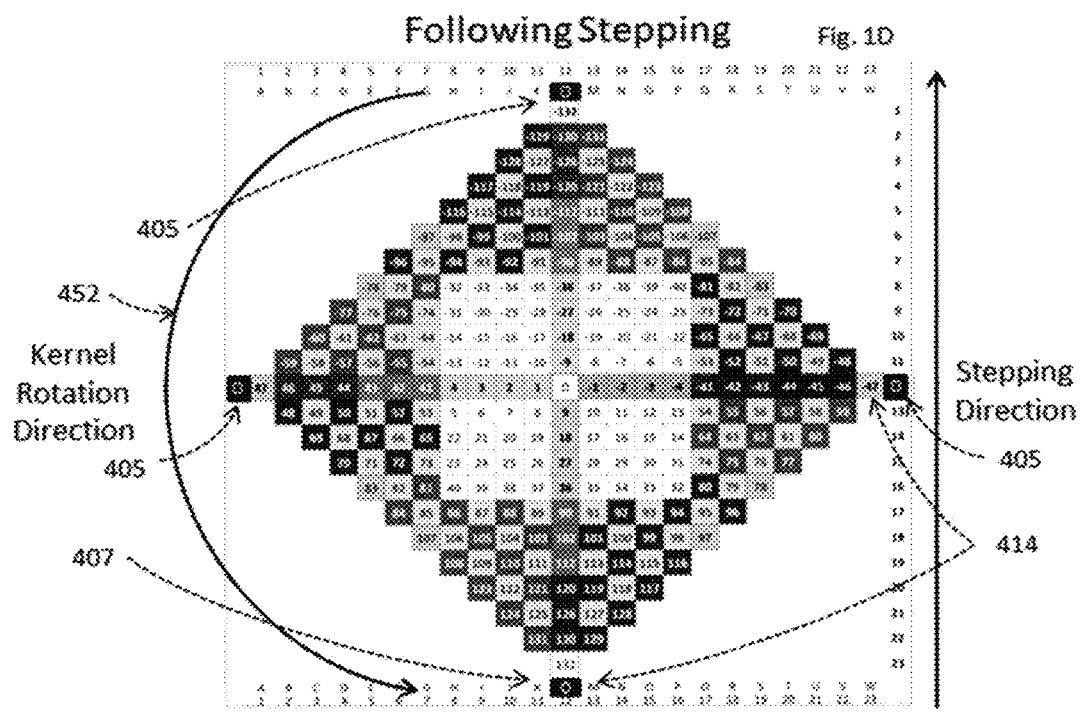

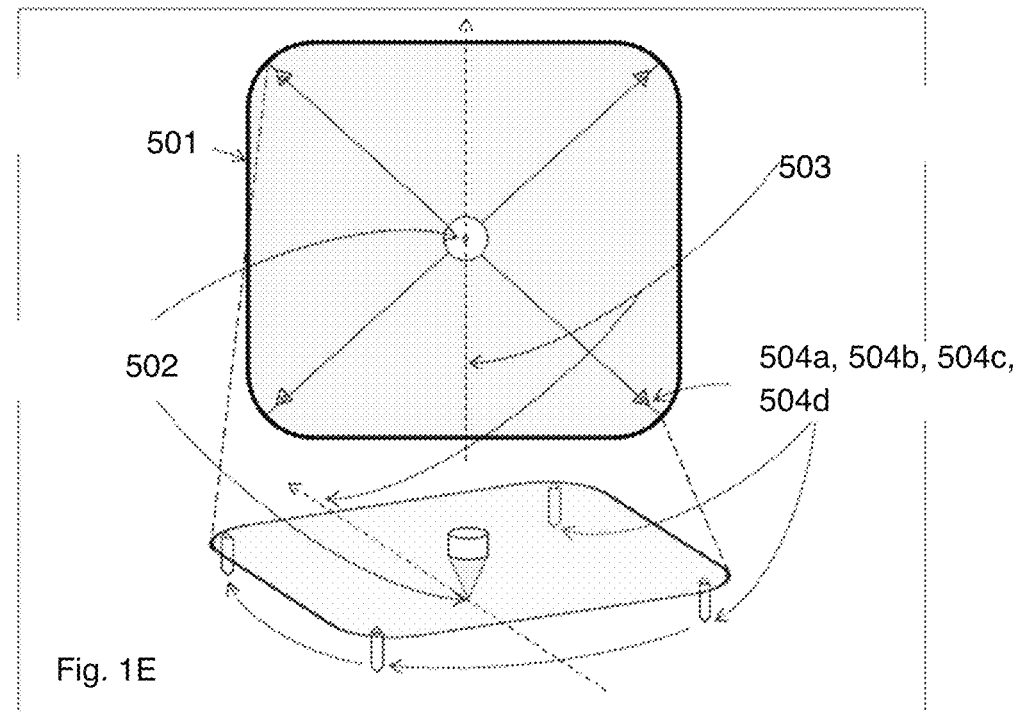
Fig. 1E
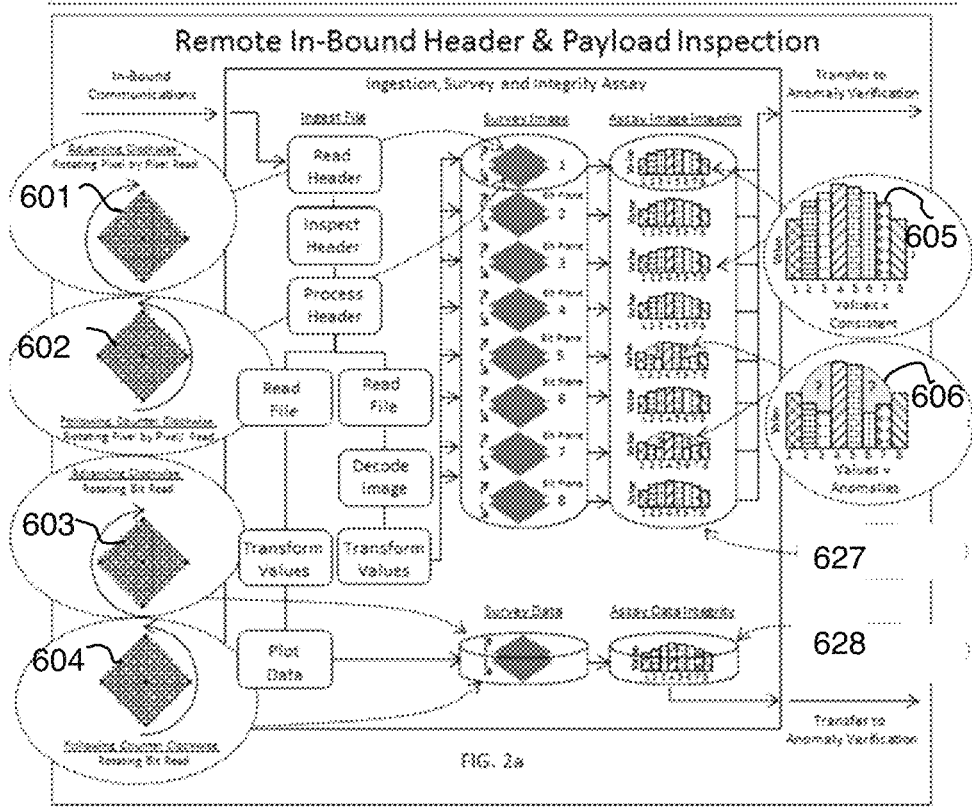

SYSTEM AND METHOD FOR DIGITAL PAYLOAD INSPECTION

CROSS REFERENCE TO RELATED APPLICATIONS

This application is related to commonly assigned and U.S. provisional patent application Ser. No. 62/391,883 (entitled "System and Method for Digital Payload Inspection,") and hereby incorporated by reference.

BACKGROUND

The present invention relates generally to a payload inspection system uses scanning techniques to identify computer software code or hidden data embedded in data communication streams without the use of a prior knowledge of the characteristics or signature of the code and without disclosure of the messages or meaning of the data communications stream.

As computer systems became a fixture in homes, office, governmental organizations, and myriad other enterprises, computer networks are increasingly exposed to malicious software distributed over digital networks. Malicious software, commonly known as malware, is software intended to damage or disrupt computers, data networks, and hardware using computer processors that can access the digital data network. Damages include erasure or theft of data, while disruptions can include theft of computer processor time, memory and network resources, propagation of malware, and installation of undesired software. Types of malware include computer worms, viruses, Trojan horses, adware, rootkits among others.

Use of 'firewalls' and signature-based malware scanning both at edge (where a distinct, "protected" local network can be segmented from the broader public network) and at the computerized device (e.g. workstations, PCs, mobile phones, computer processor-equipped devices) allows some defense against malware that has previously been identified. Currently there are no reliable means to detect and immediately neutralize cyber threats previously undetected or identified. Known as 'zero-day' exploits because they operate without incurring reaction or remediation for indeterminate, often extended periods of time. As a result, zero-day threats bring the potential of significant risks and damage, and allow the attacks the time to continually change the nature and form of the exploit.

One method of gaining ingress into a firewall-protected network is by use of steganographically hidden coding. Steganography, which originally referred to the science of concealing messages within images, now includes messages hidden in image, audio and other data files sent in digital data communications. Besides executable software, steganography technique may also be used to conceal stolen data in transport.

SUMMARY

The payload inspection system uses scanning techniques to identify computer software code embedded in data communication streams without the use of a priori knowledge of the characteristics or signature of the code.

A bitwise scanning technique is used on a data stream allowing determination of the presence of encoded software or data without perception or discernment of the contents of the messaging carried in the data stream allowing for a sealed environment limiting access or knowledge of the data stream from outside observation.

By preventing the ingress and egress of malware into computerized systems, the payload inspection system prevents damage or disruption to protected systems and networks.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 1C graphically depicts the forward step component of the Inspection Kernel

FIG. 1D graphically depicts the following step component of the Inspection Kernel FIG. 1E depicts the Bit/Pixel Inspection Table used in payload inspection FIG. 2A depicts the attributes of the Payload Inspection Topology Inspection system;

DETAILED DESCRIPTION

We will now describe illustrative embodiments of the present invention. First, we provide a detailed overview of the problem and then a more detailed description of our solutions though the use of illustrative embodiments.

Data communications are vitally necessary to modern enterprises. Malware adds an element of danger in allowing local computational hardware to access public data networks such as the internet. Use of encryption technique can be used to shield (aka 'virtual private networking (VPN)' or 'tunneling') communications from interception between endpoints, firewalls can prevent ingress or egress of data communications to known suspect endpoints, and scanning software can identify and block data using known characteristic (aka signatures), but none of these techniques can be used to block malware hidden using steganographic techniques or simply not previously known to anti-malware tool vendors.

The payload inspection detailed herein can be used to detect and prevent the ingress of malware or egress of data in communication streams. This system, the Mycroft System, may be used singly or in conjunction with other communications systems such as a proxy server. For instance, use of an ancillary proxy server can be used as a man-in-the-middle agent, perhaps as part of a firewall system that brackets the inputs and outputs of the payload inspection system, to intercept, collect and store encryption keys and certificates. Possession of these keys and certificates would allow the un-encryption of data streams before processing of the data stream by the payload inspection system. A data stream may be duplicated and held until released by the payload inspection system or re-encrypted after processing by the payload inspection system as needed.

Table 1 is used to set definitions for the terminology used in the description of the payload inspection topology.

Internal communications: (i) Segregate the processing and transport of content payload and metadata, and; (ii) Transport content payloads and metadata in separate 'shape-shifting' non-public communications channels.

Figure 1A:
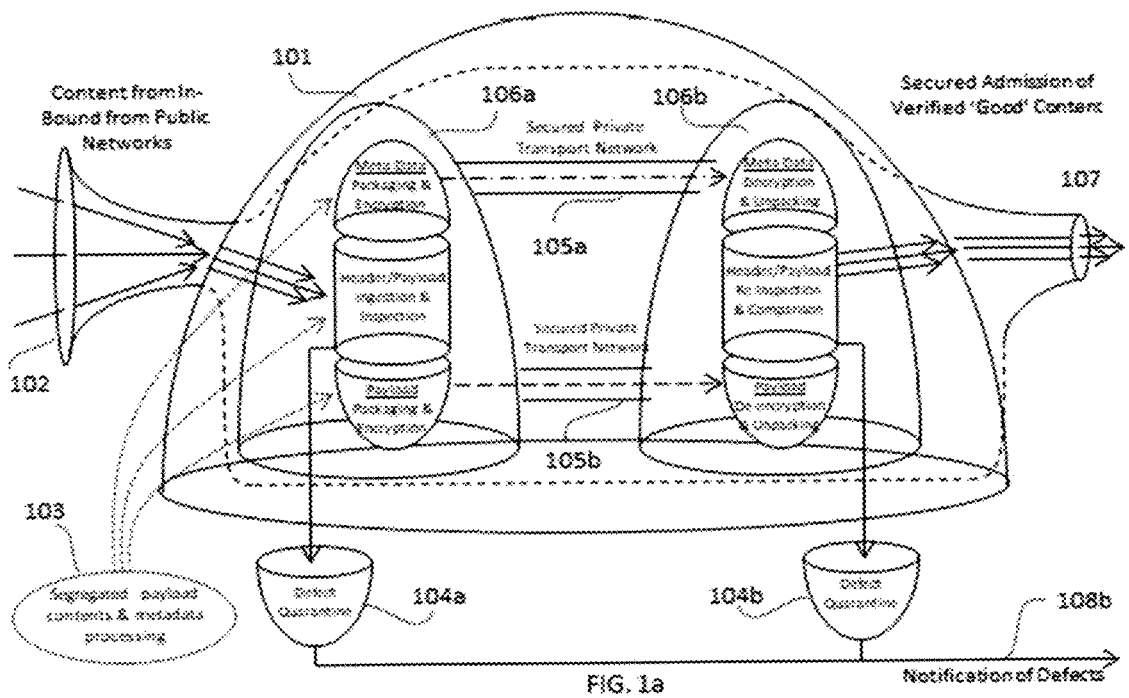
FIG. 1A depicts the attributes of the Payload Inspection Topology.

FIG. 1*a* depicts the attributes of the payload inspection topology. The topology is configured with a single point of entry for all communications payloads 102, and a single point of exit for all verified good communications payloads 107. This is to ensure the inspection process is consistent, stable and unaffected by any communications payloads or outside influences. Verified or suspected defective payloads are expelled through a single directional port to be processed separately and to be communicated outside of, and completely independent of the core infrastructure 104.

The operating environment is functionally inert or sterile for any and all executable code not verified as authentic and verified 'good' to the system processes 106. All system management commands, communications and updates are subjected to the same inspection processes of all inbound content. Processing, including all communications and transportation, flows in one direction only. This is to 'rectify' processing flows such that the processes cannot be observed or influenced 108.

After initial ingestion all processes and all communications take place: (i) within an operating topology that is entirely isolated end-to-end from external environments and outside inspection or intervention 101, and; (ii) each processing stage is further isolated, including from all other internal processes in separate discrete sealed environment 106*a*, 106*b*.

Communications headers and content payloads processing are segregated and independently inspected 103. No communication is released to subsequent processes, including transport to either follow-on internal processing of the addressee, unless and until both the header and payloads are verified 'good.' Headers and payloads are encrypted separately for backhaul communications across discrete separate channels 105*a*, 105*b*.

The uncertain, widely varied forms and continuously evolving techniques employed by cyber threats require: (i)

TABLE 1

'Sealed' refers here to an operating and communications infrastructure that is impervious to penetration by signals from external environments and sources, and is equally is an impervious barrier to signals emanating from processes operating within the infrastructure.
'Inert' refers here to an operating environment that beyond the system itself such that there is no inherent power of action, code execution or unintended communications.
'Rectifying' refers here to the application of the principle of orienting the flow of processes such that (i) product and results of processing can only move in a single direction, and (ii) from an external perception the form or format of the content appears to have been transformed should it be observed.
'Shape-shifting' refers here to the application of the principle of randomly selecting from portfolios of discretely different (i) communications networks and protocols; (ii) encoding formats, and; (iii) file parsing and steganographic methods.
'Headers' refers here to any and all pre-existing and derivative control information relating to or documenting the attributes of the communications payload.

The payload inspection topology is an end-to-end communications infrastructure that: (i) is completely 'sealed' from all external environments and systems; (ii) is entirely 'Inert' to all non-native computing code or communications processing; (iii) expels all defective files to entirely separate external systems, and; (iv) has single points of entry and exit, and processing flows that move in a single direction, thereby 'rectifying' communications direction.

Initial inspections be performed in facilities that are jurisdictionally and geographically isolated from user infrastructure, and; (ii) Payloads be inspected twice using orthographically different inspection parameters so that; (a) The accuracy of the original scan is confirmed, and; (b) The integrity of the communications links and transport of payloads is verified. The remote inspection entity described herein allows for the needed deployment flexibility.

Table 2 details the terminology used in describing the irregular polygon survey palette.

TABLE 2

'Dwell angle' refers here to the angle in degrees relative the linear write of the data or image file. In this instance the dwell angle is itself randomly generated so as to be unique to the inspection of each file. The selected dwell angle becomes a data element within the package a meta-data that is built to document the inspection process and to communicate to subsequent processes.
'Inert' refers here to an operating environment that beyond the system itself such that there is no inherent power of action, code execution or unintended communications.
'Stepping Path' refers here to the direction along which sequential writes to memory are made in one-bit/pixel increments. See FIG. 1E x-axis forward stepping path 503.

Figure 1B:
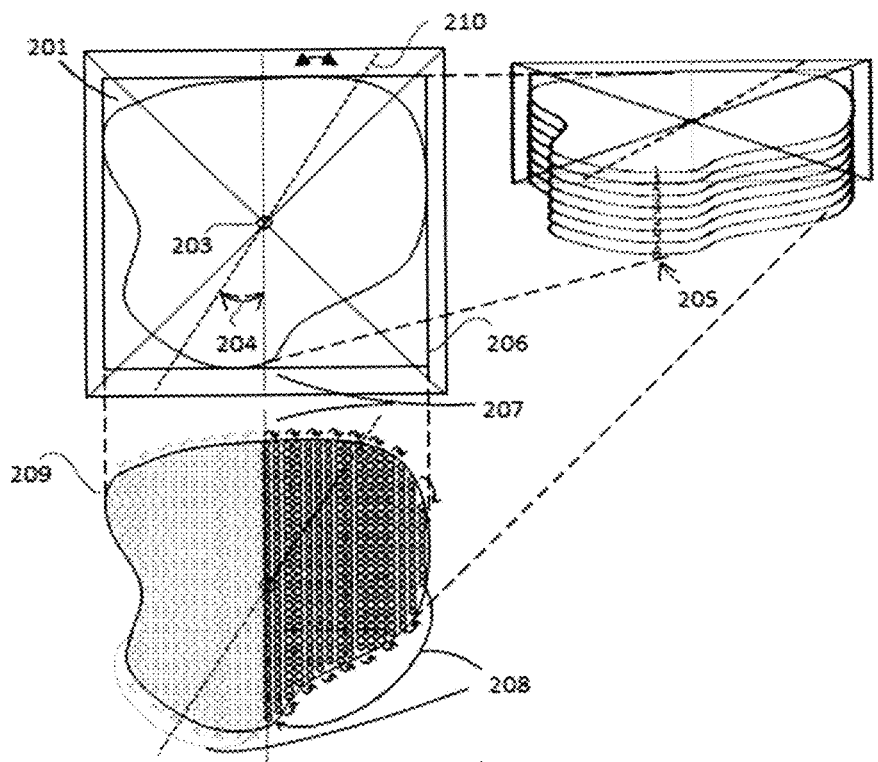
FIG. 1B illustrates the Irregular Polygon Survey Palette
Figure 3:
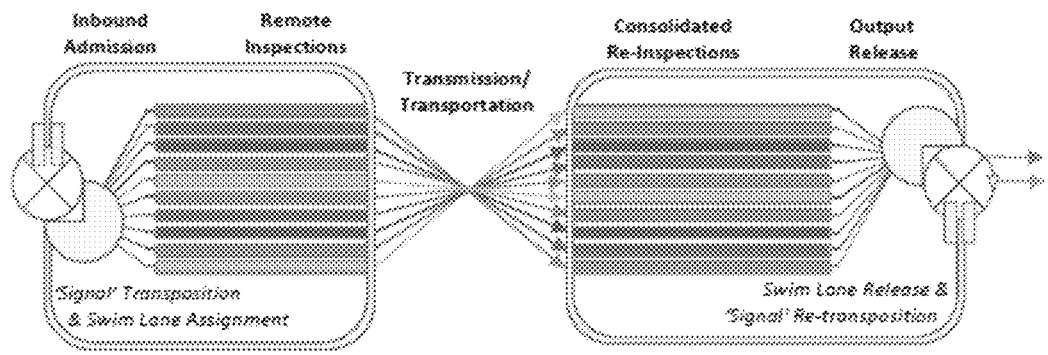
FIG. 3 depicts the processing and communication 'bell jar'
Figure 4:
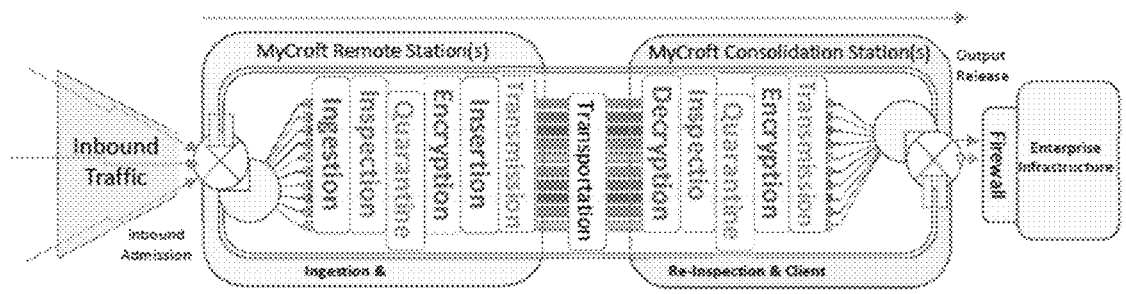
FIG. 4 depicts the communications 'rectifiers'
Figure 5:
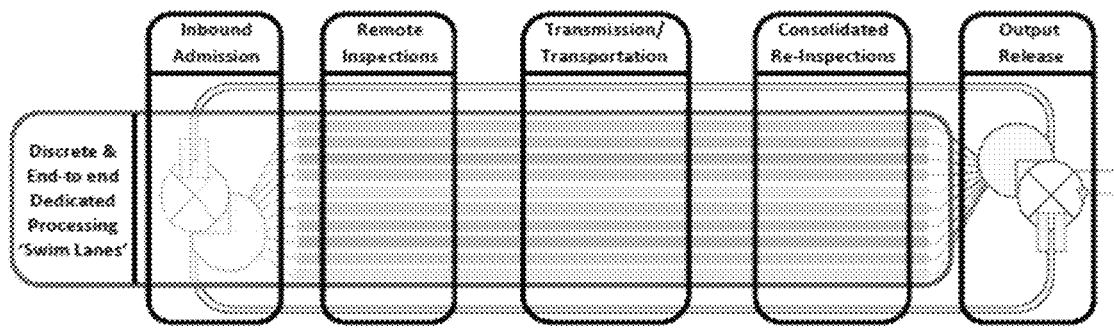
FIG. 5 depicts the secured 'black-box' topology and operations
Figure 6:
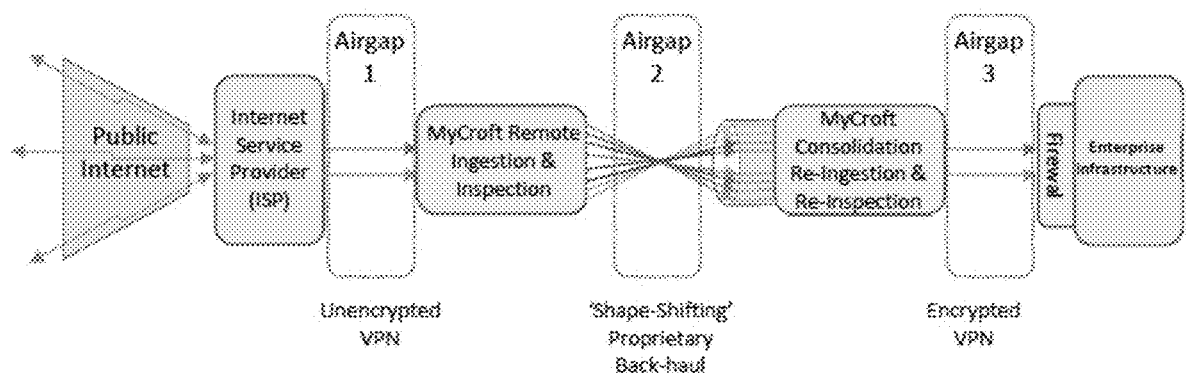
FIG. 6 depicts the three randomized shapeshifting 'air-gaps'
Figure 7:
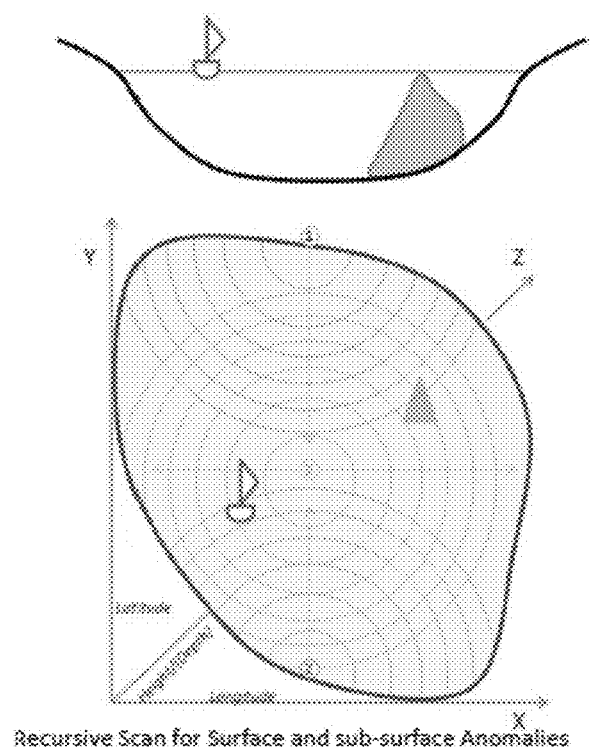
FIG. 7 depicts the recursive Scan for Surface and subsurface Anomalies
Figure 8:
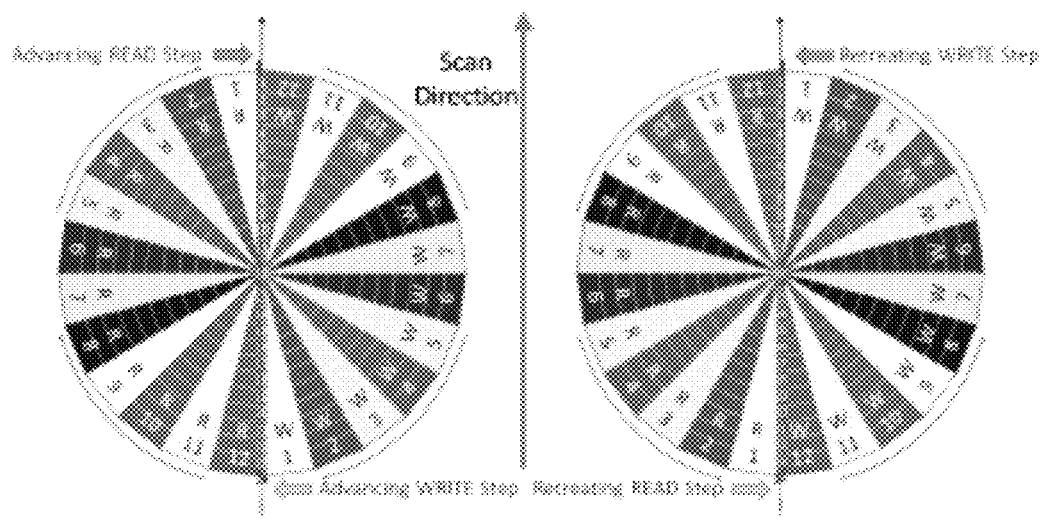
FIG. 8 depicts the counter-rotating inspection 'kernel'
Figure 9:
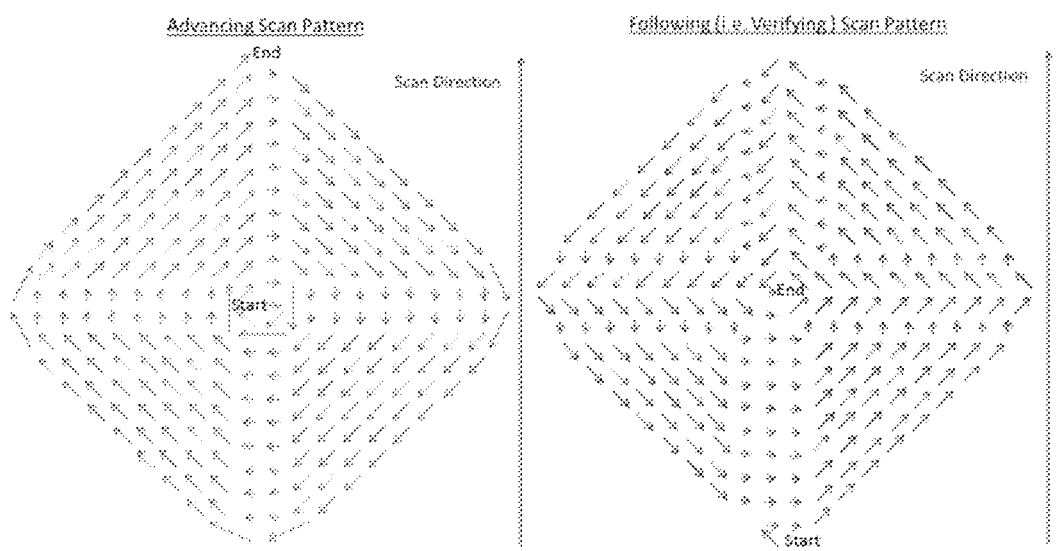
FIG. 9 depicts the 'spiral scan' patterns
Figure 10:
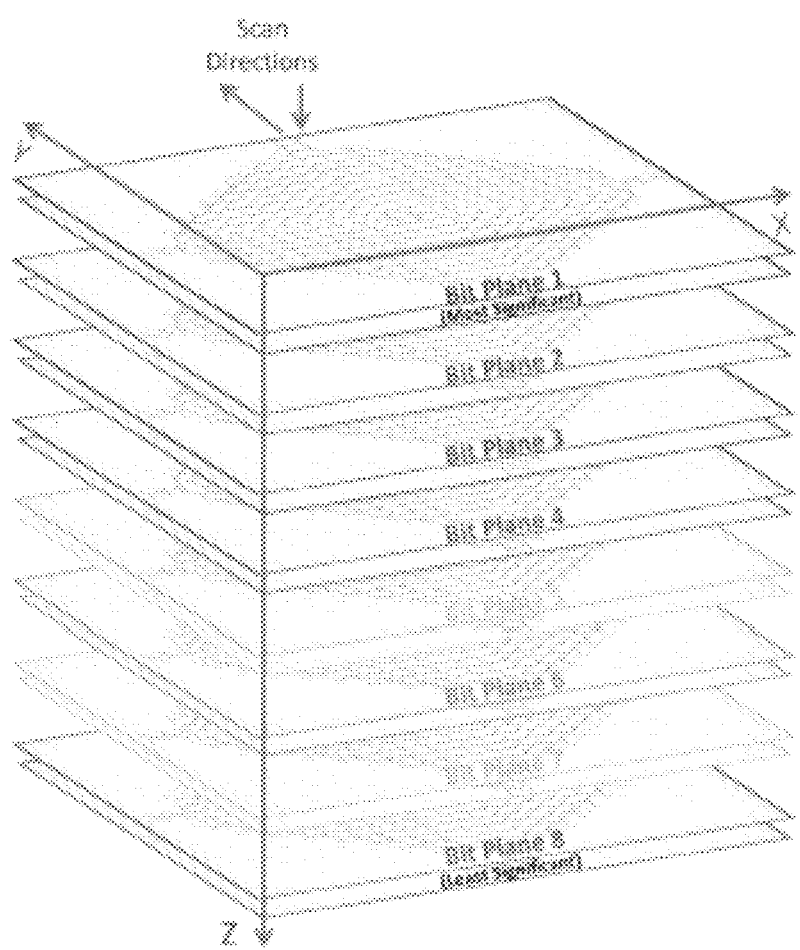
FIG. 10 depicts the 'Three-Dimensional Bit/Pixel Inspection'
Figure 11:
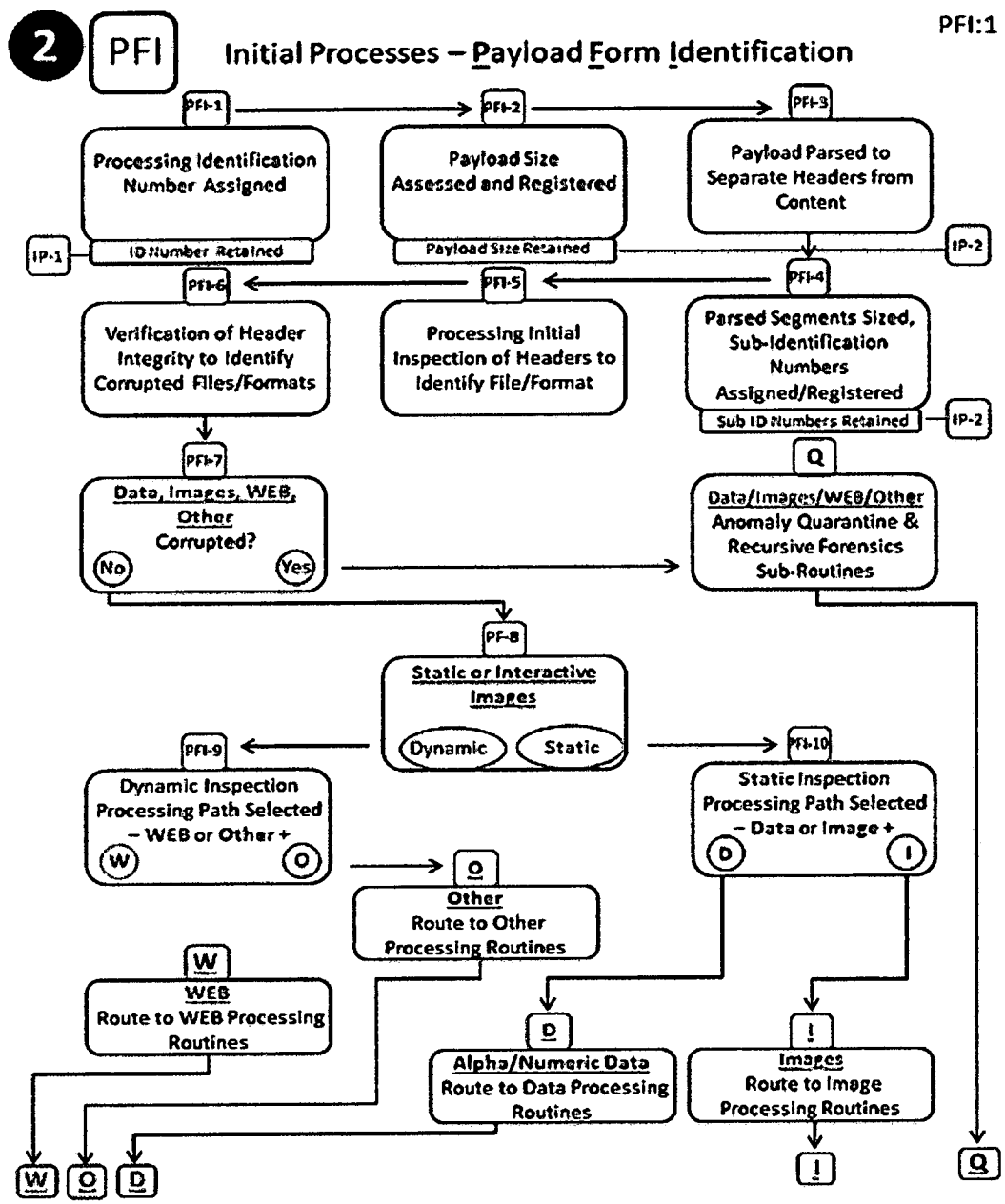
FIG. 11 is an initial process, payload form identification
Figure 12:
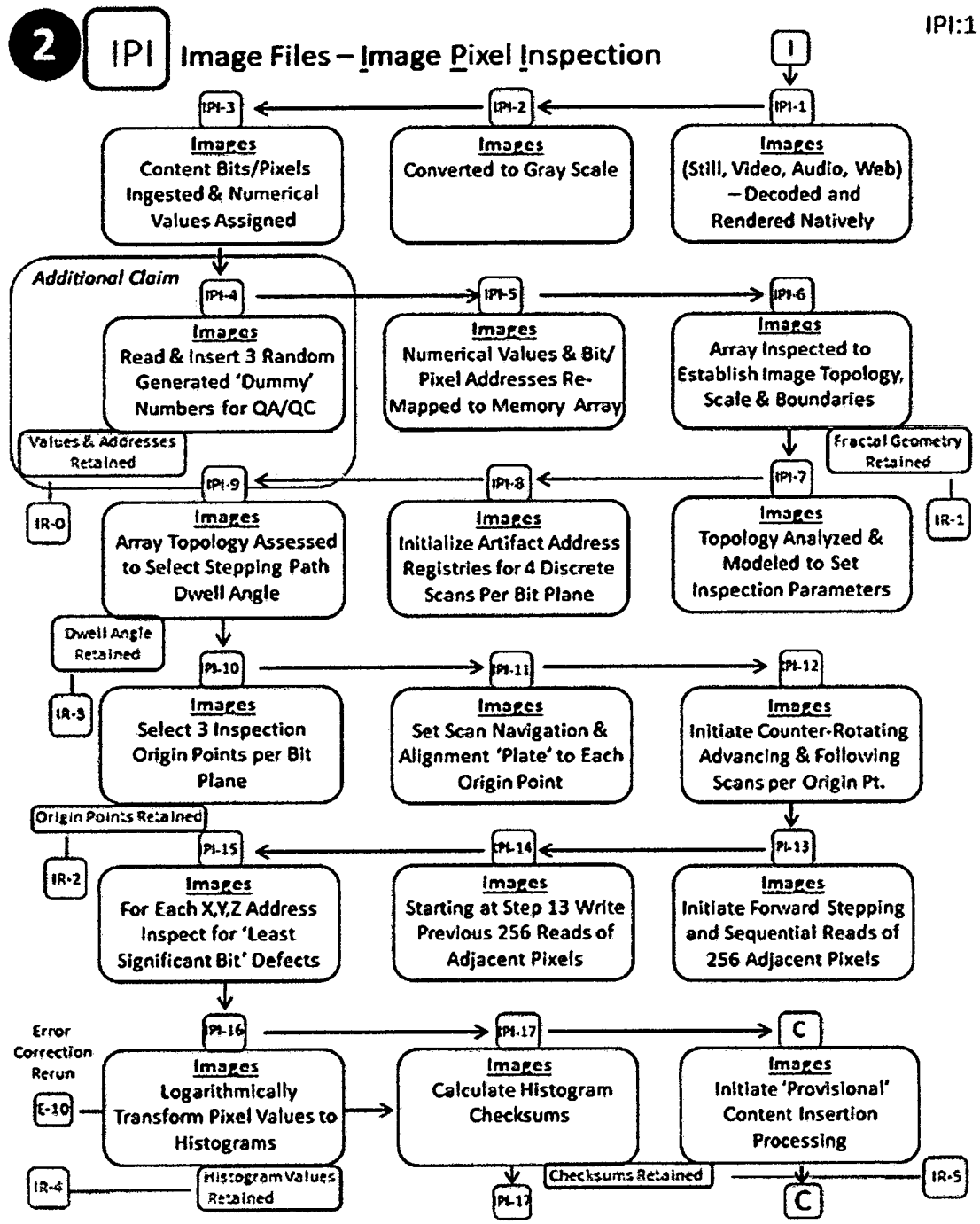
FIG. 12 is an image files; image pixel inspection.
Figure 13:
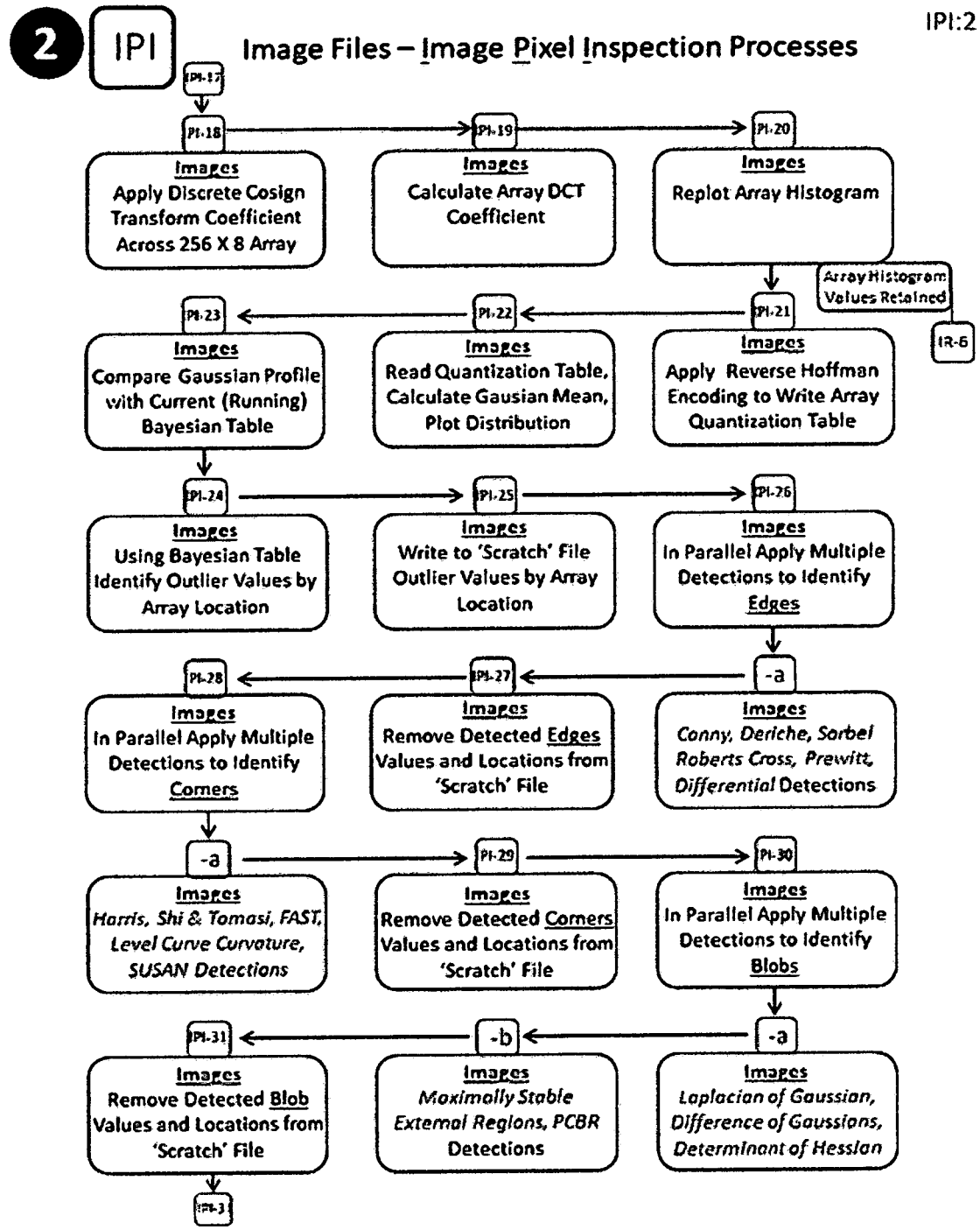
FIG. 13 is an image files; image pixel inspection processes.
Figure 14:
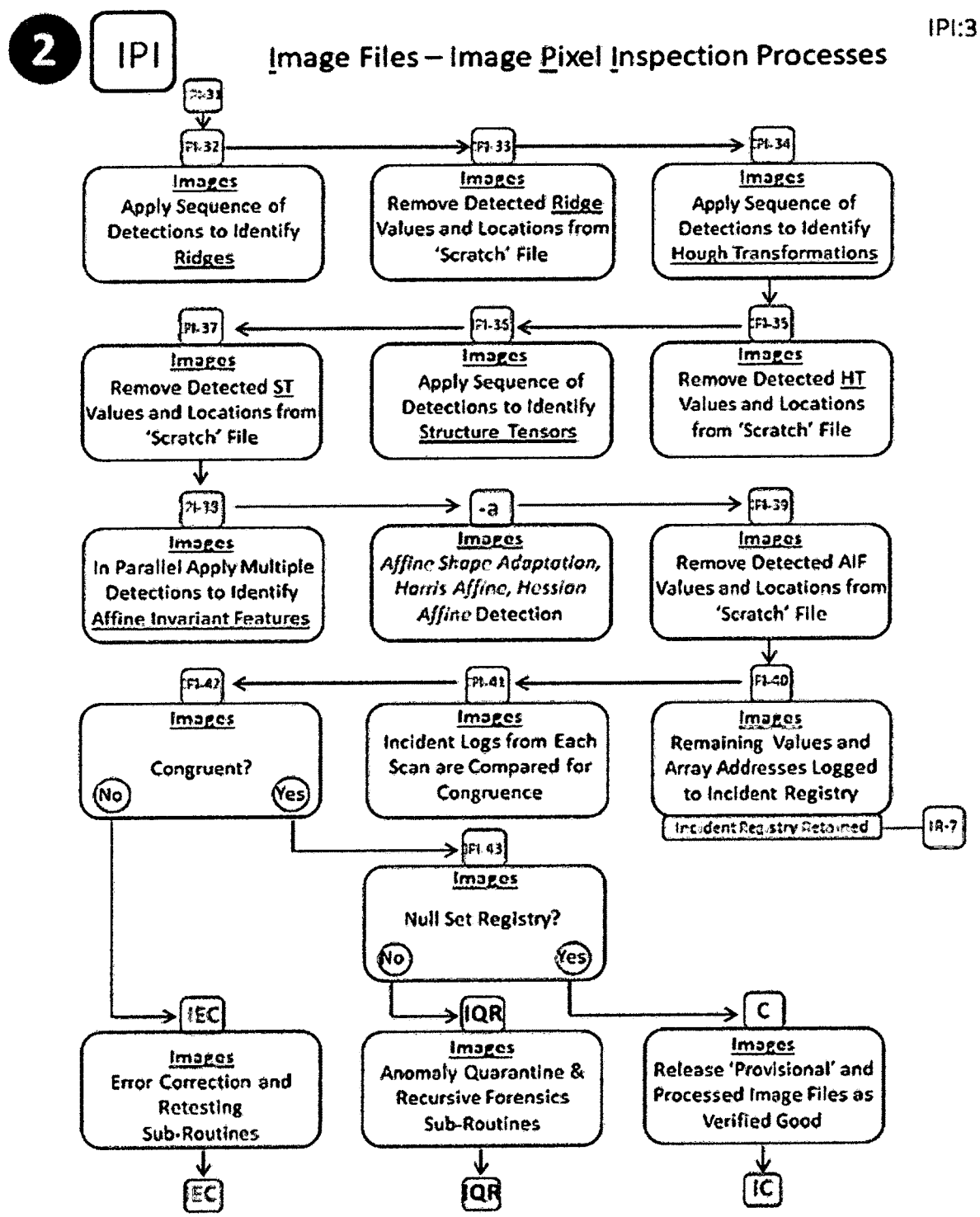
FIG. 14 is an image files; image pixel inspection processes version 3.
Figure 15:
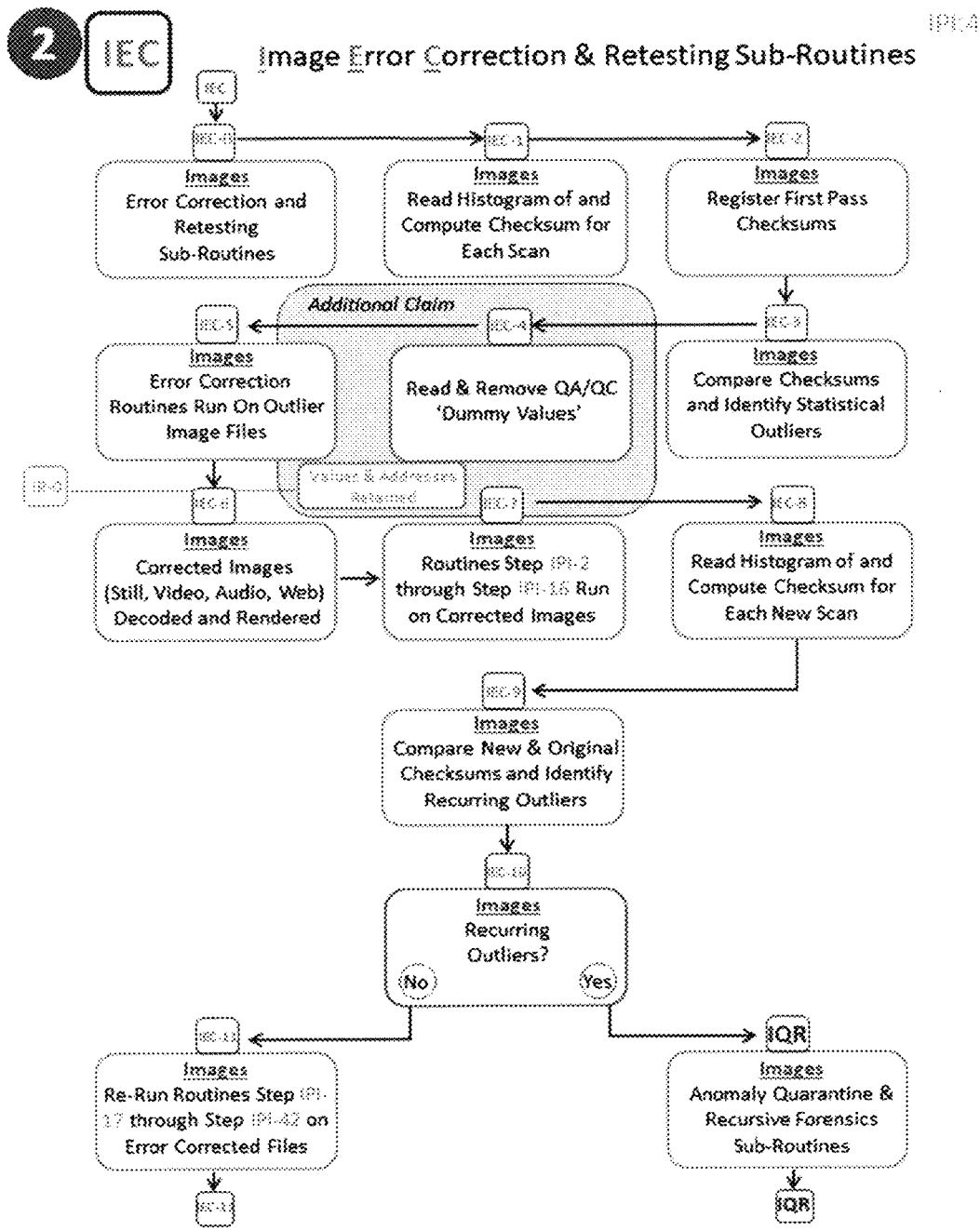
FIG. 15 is an image error correction and retesting subroutines.
Figure 16:
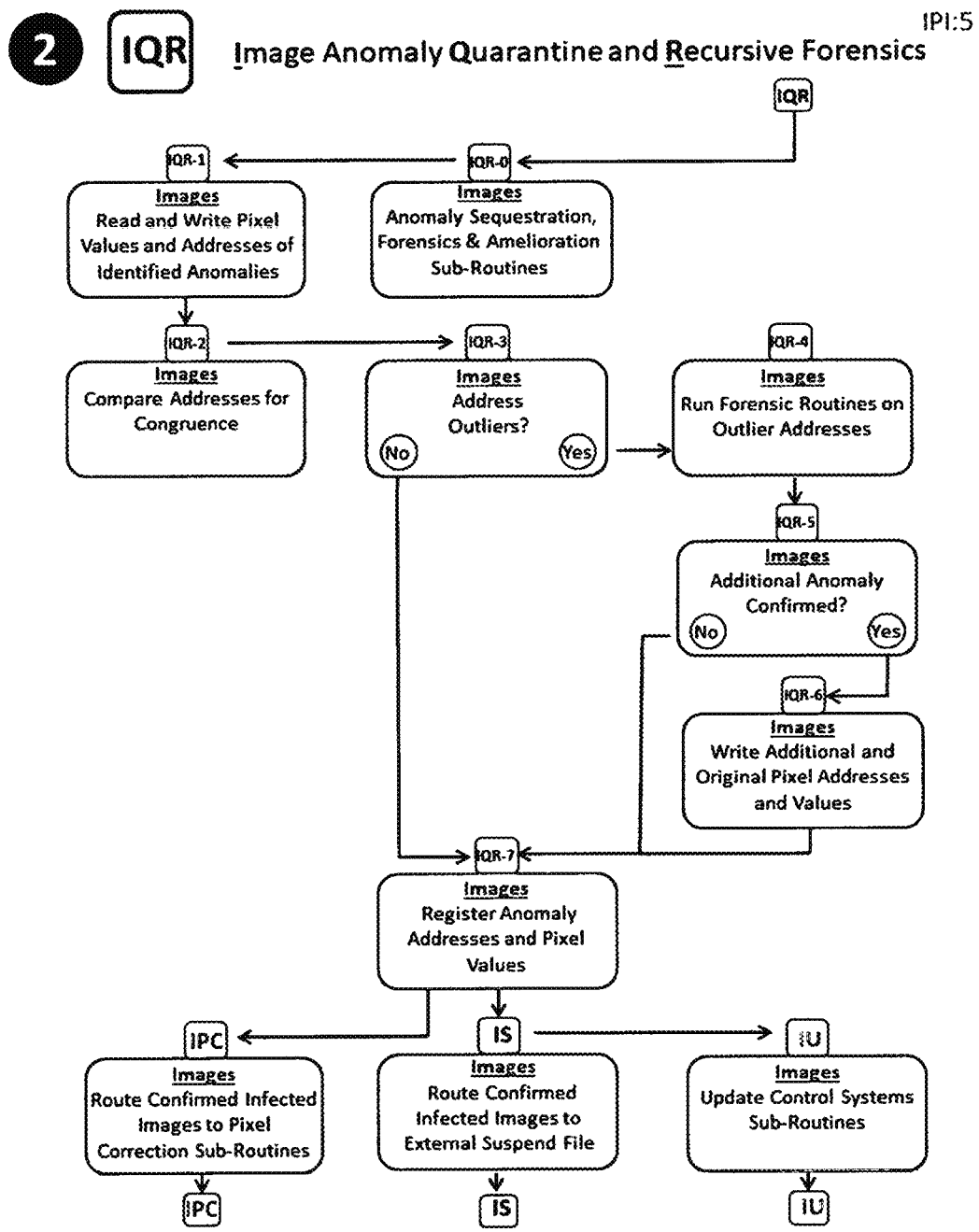
FIG. 16 is an image anomaly quarantine and recursive forensics.
Figure 17:
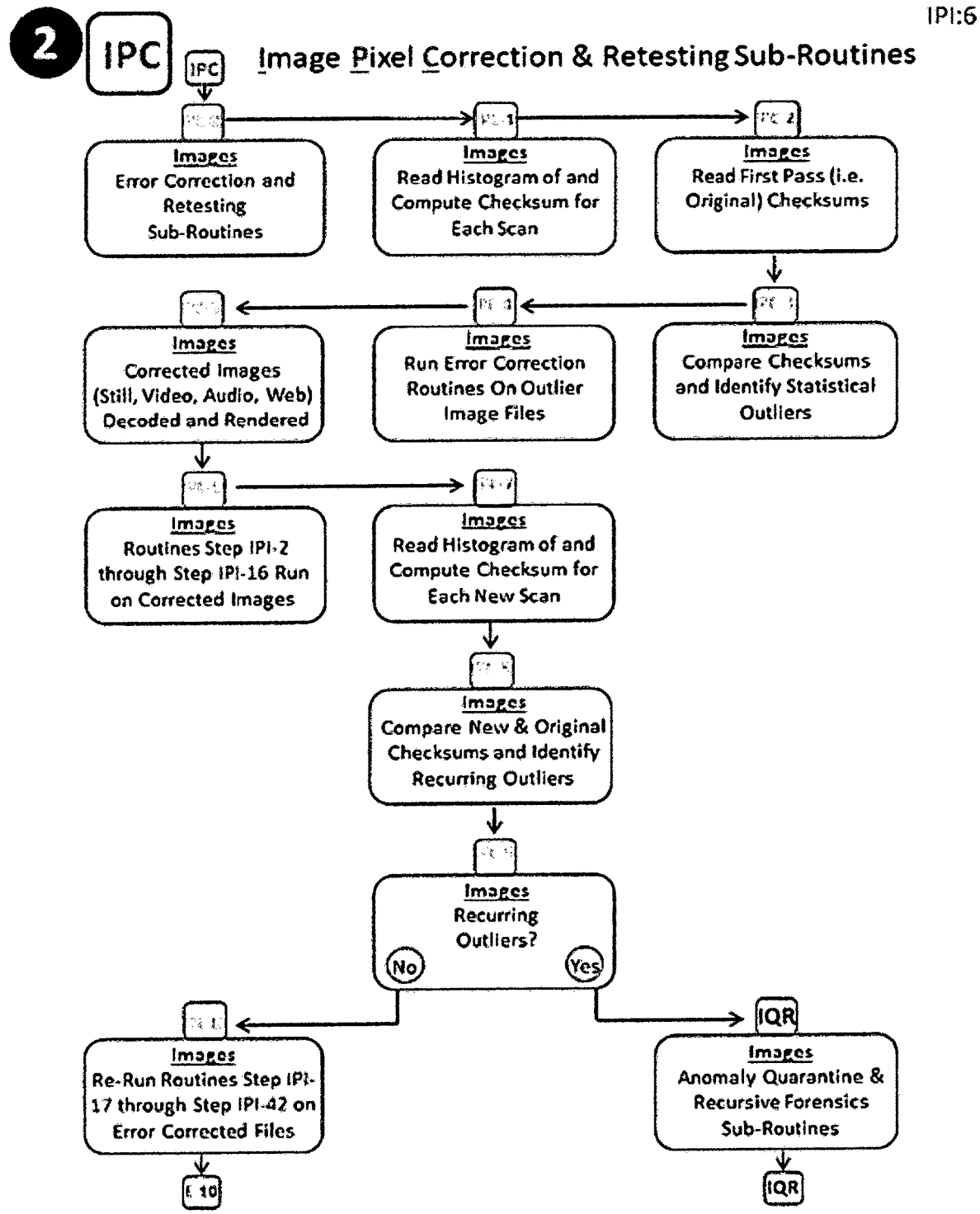
FIG. 17 is an image pixel correction and retesting subroutines.
Figure 18:
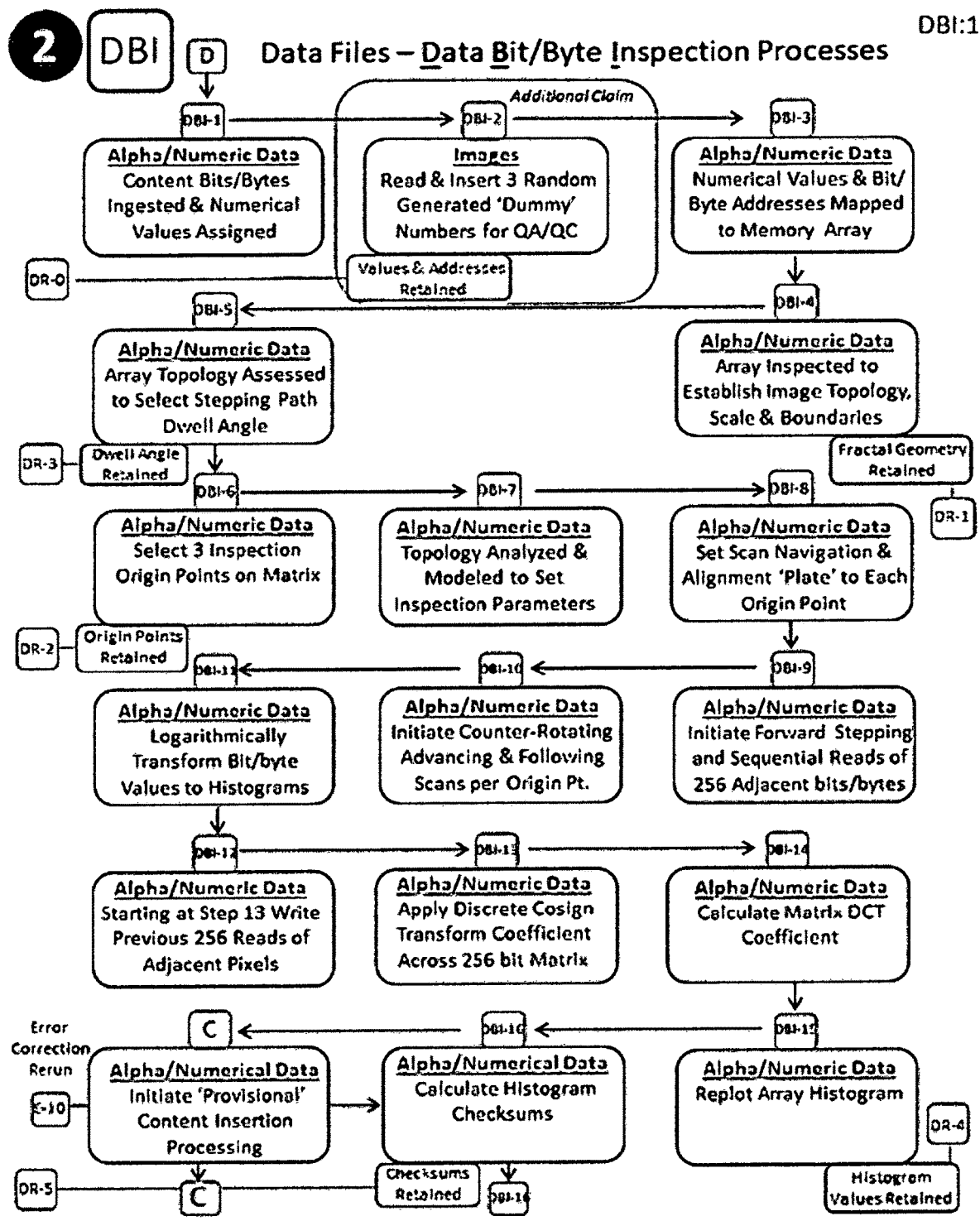
FIG. 18 is a data files—data bit/byte inspection processes.
Figure 19:
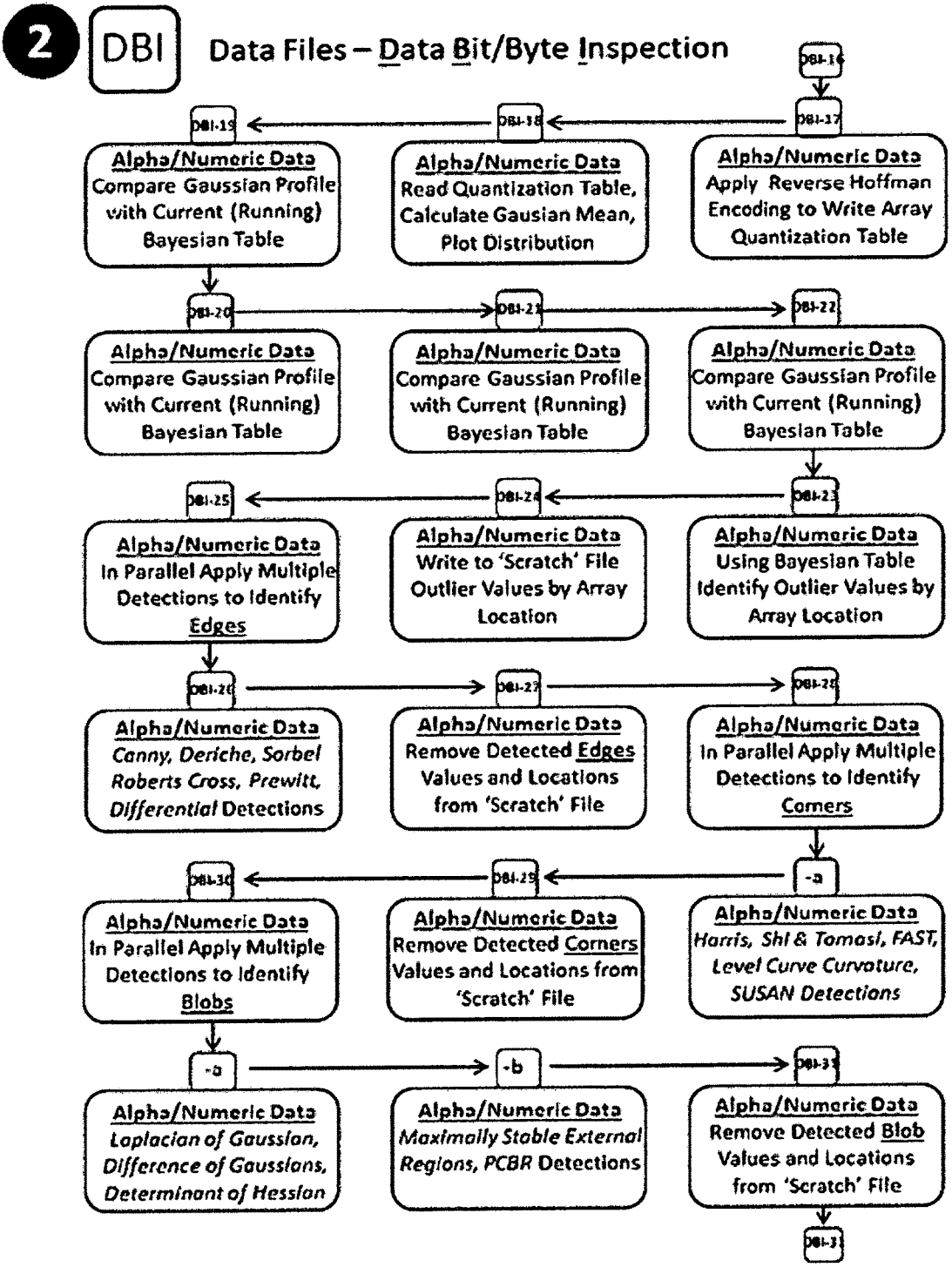
FIG. 19 is a data files—data bit/byte inspection version 2.
Figure 20:
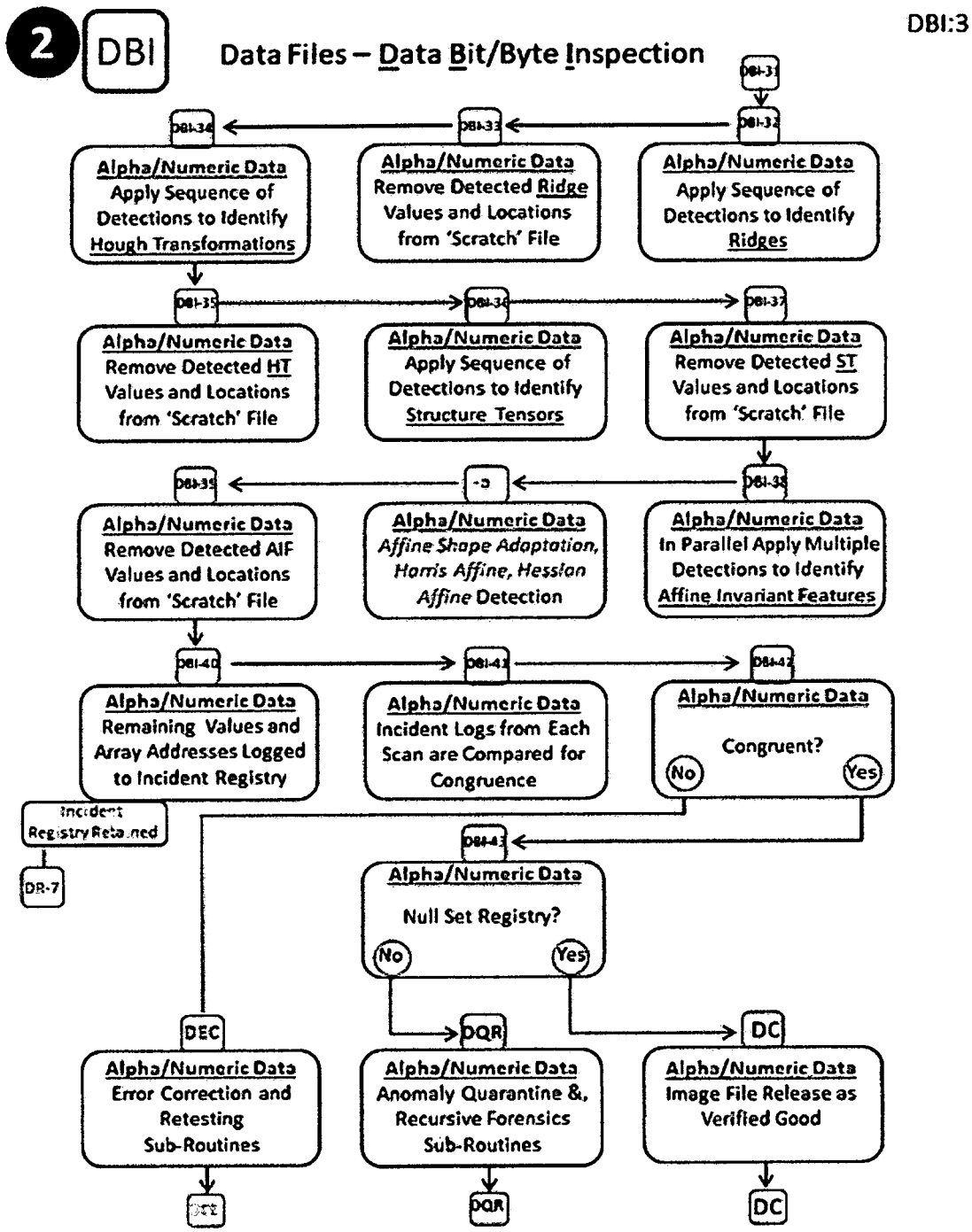
FIG. 20 is a data files—data bit/byte inspection version 3.
Figure 21:
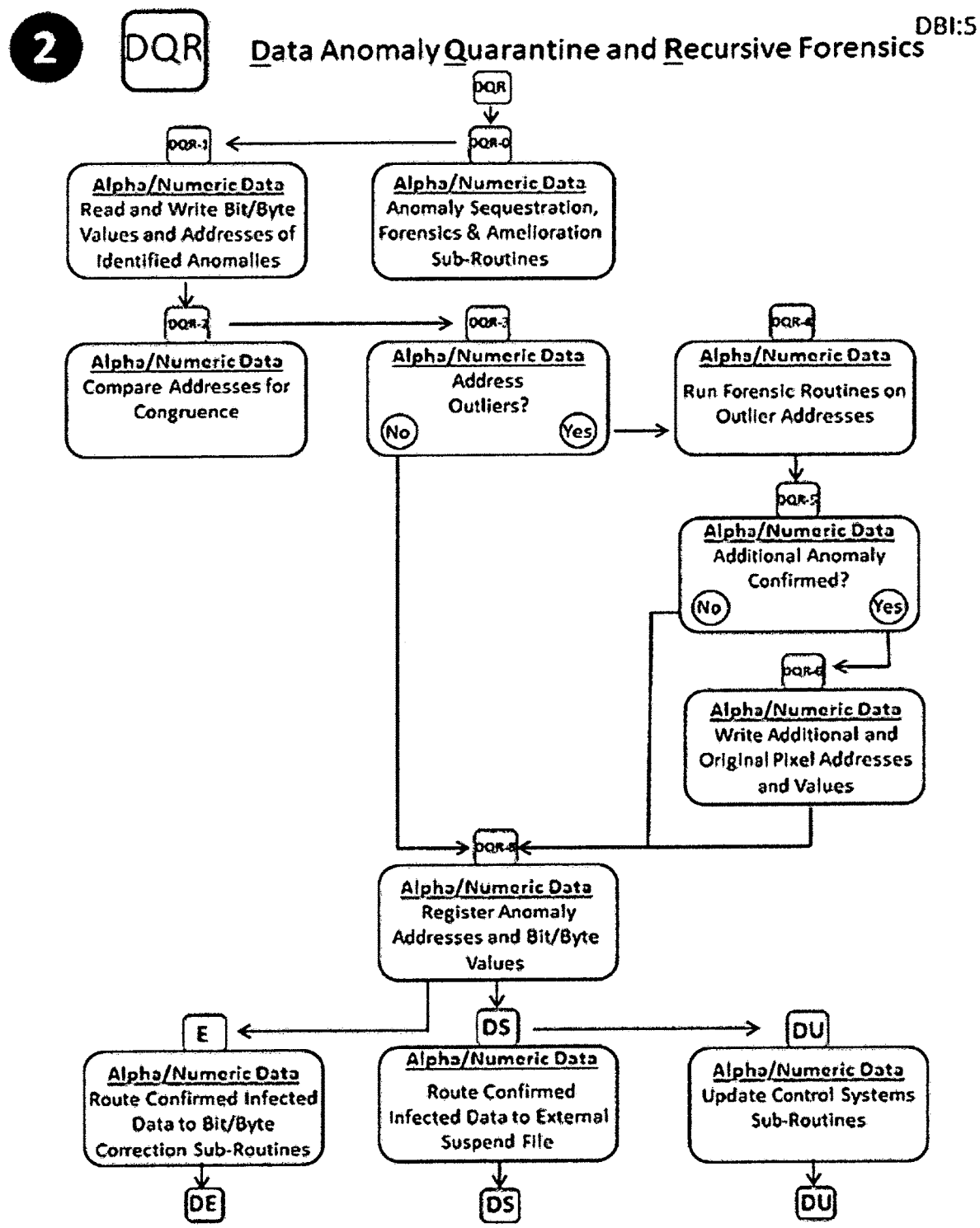
FIG. 21 is a data anomaly quarantine and recursive forensics.
Figure 22:
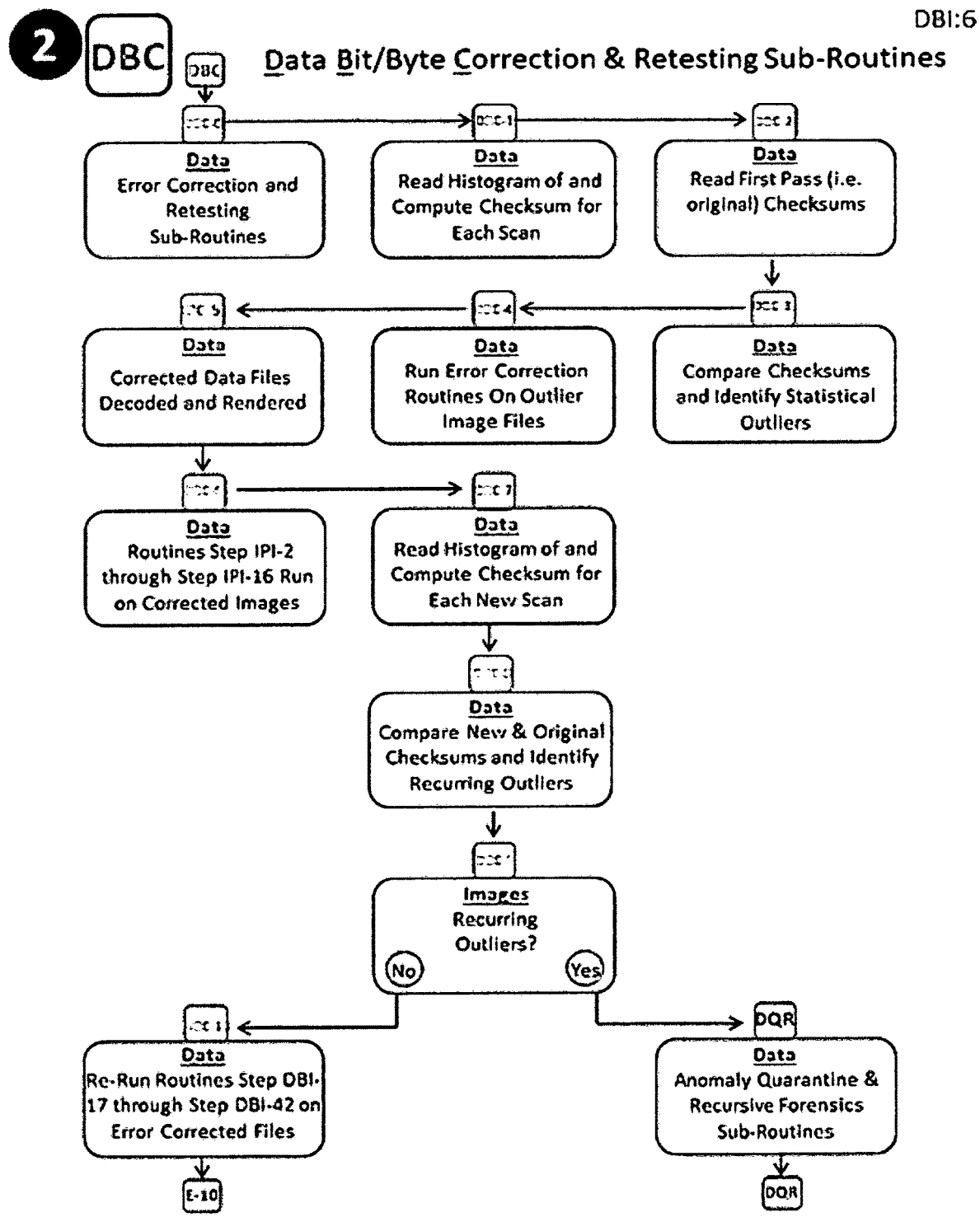
FIG. 22 is a data bit/byte correction and retesting subroutines.
Figure 23:
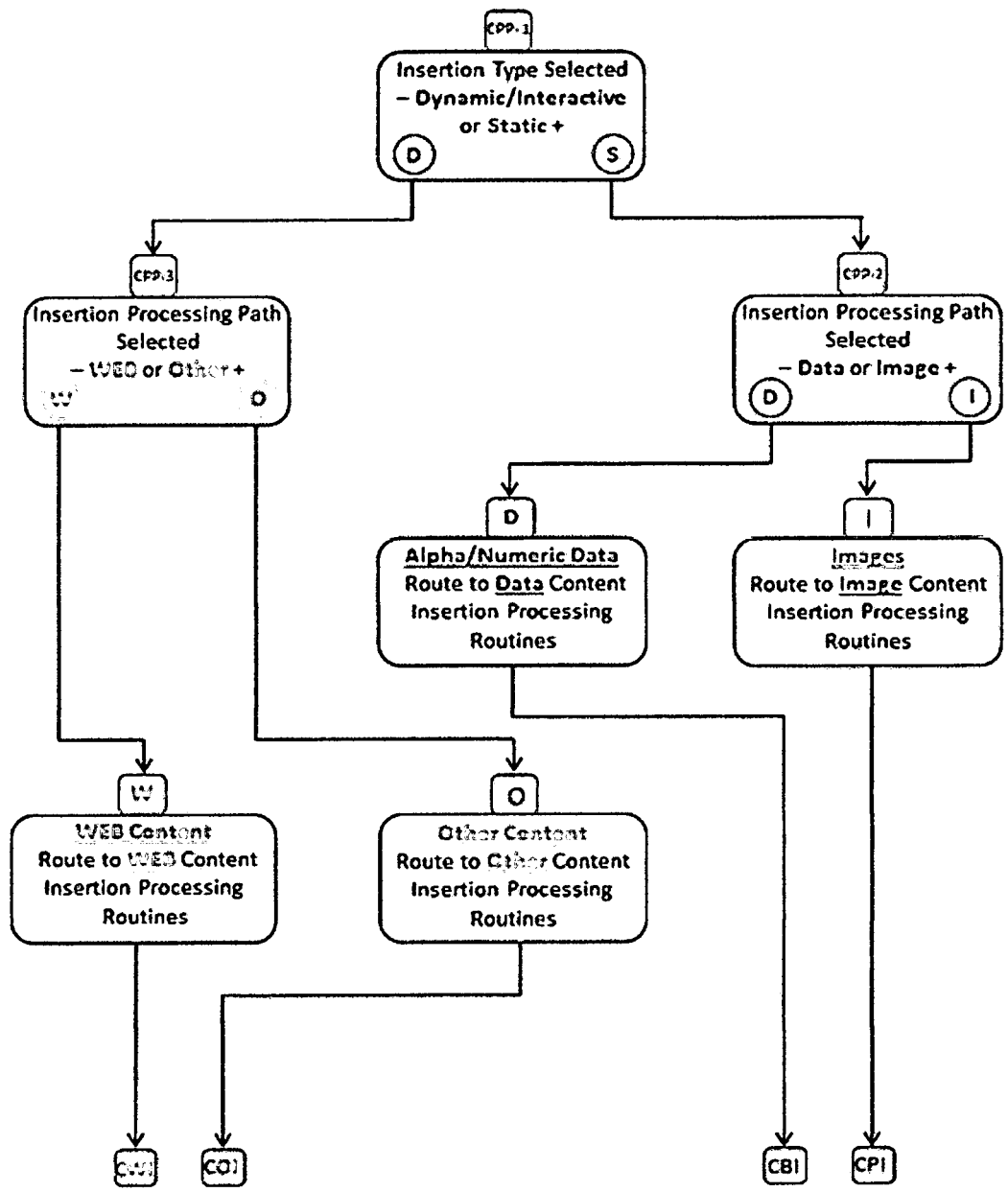
FIG. 23 is an initial processes—determination of content encryption and steganography processing paths.
Figure 24:
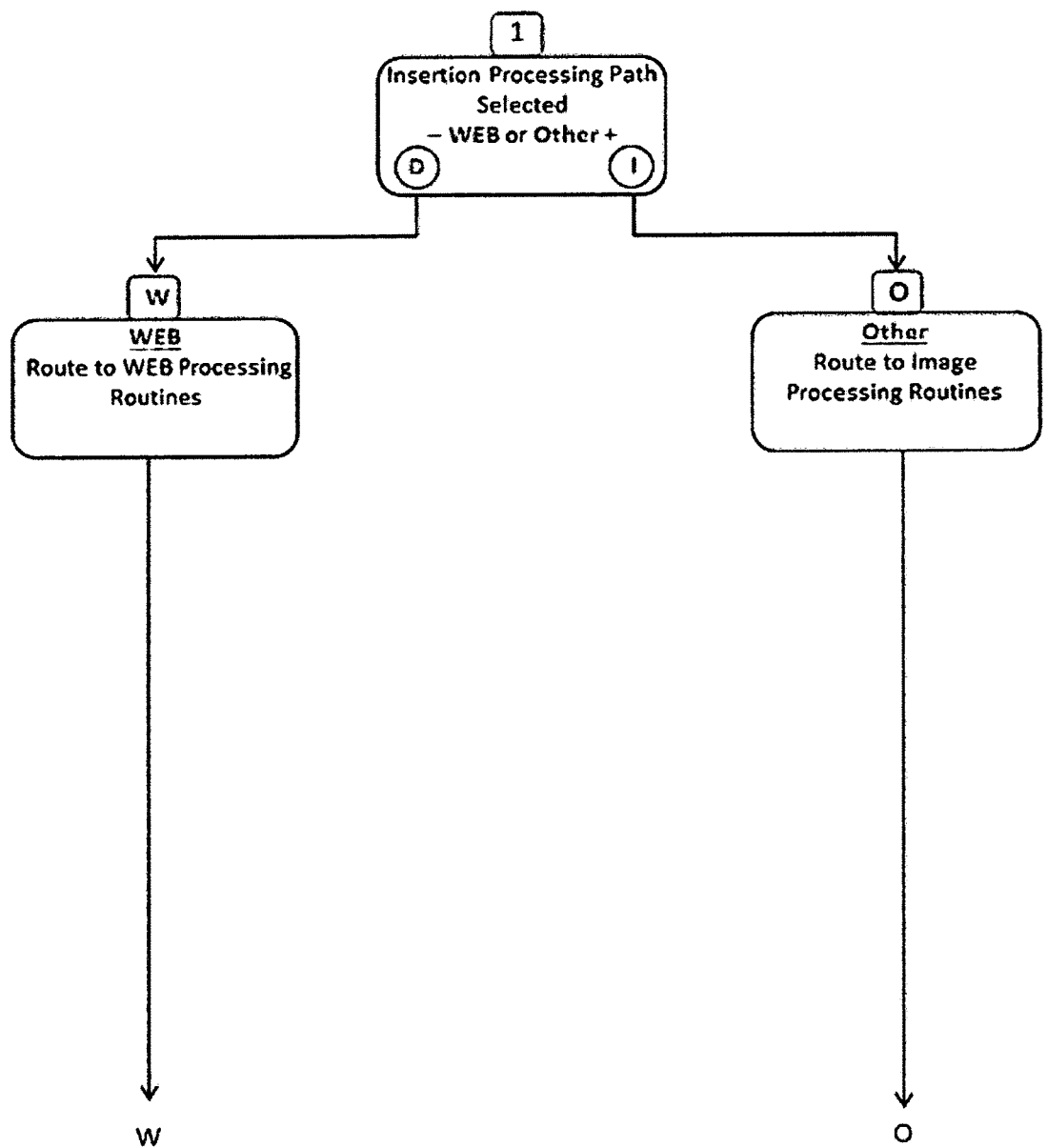
FIG. 24 is an initial processes—dynamic content encryption and steganography.
Figure 25:
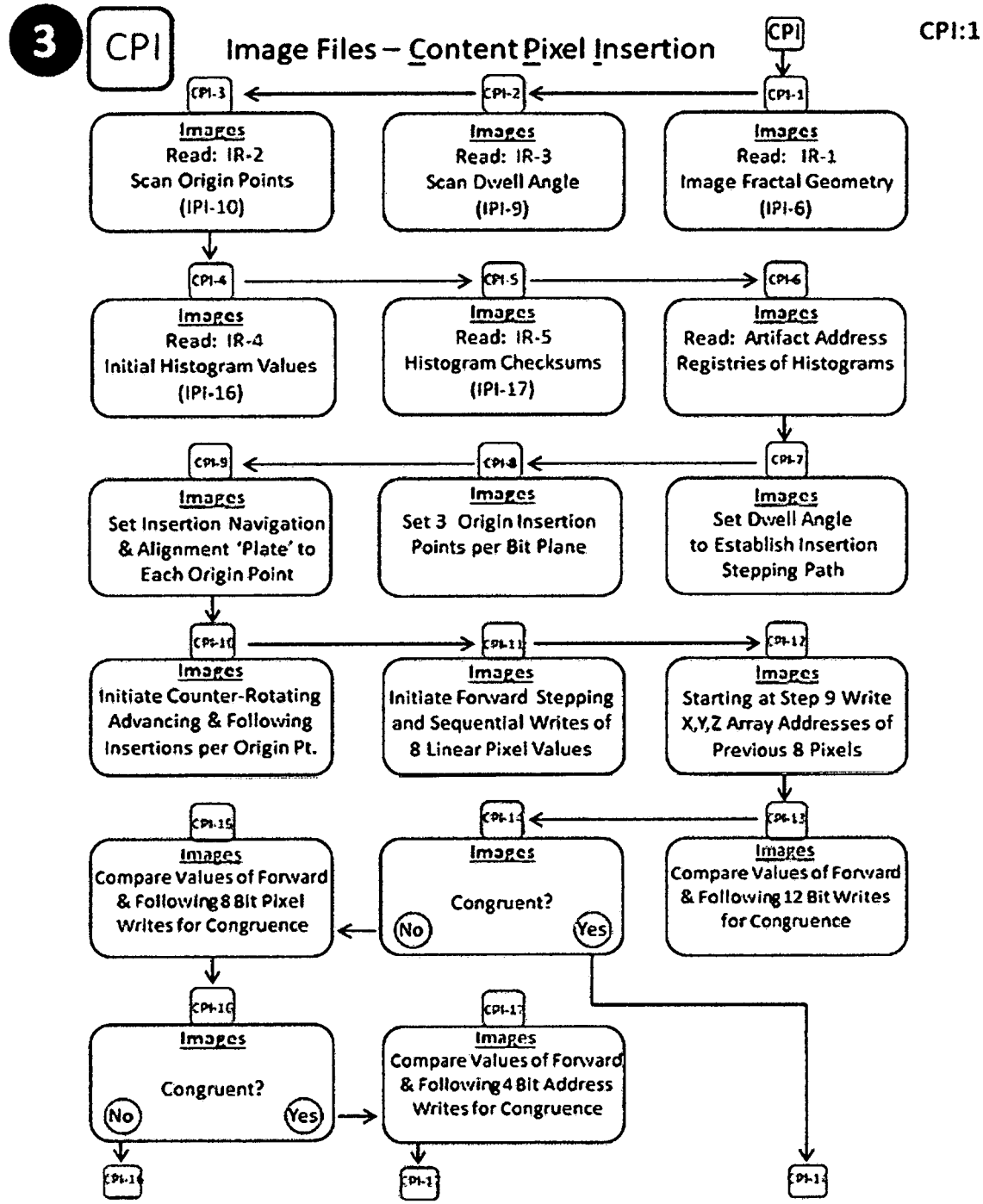
FIG. 25 is an images files—content pixel insertion.
Figure 26:
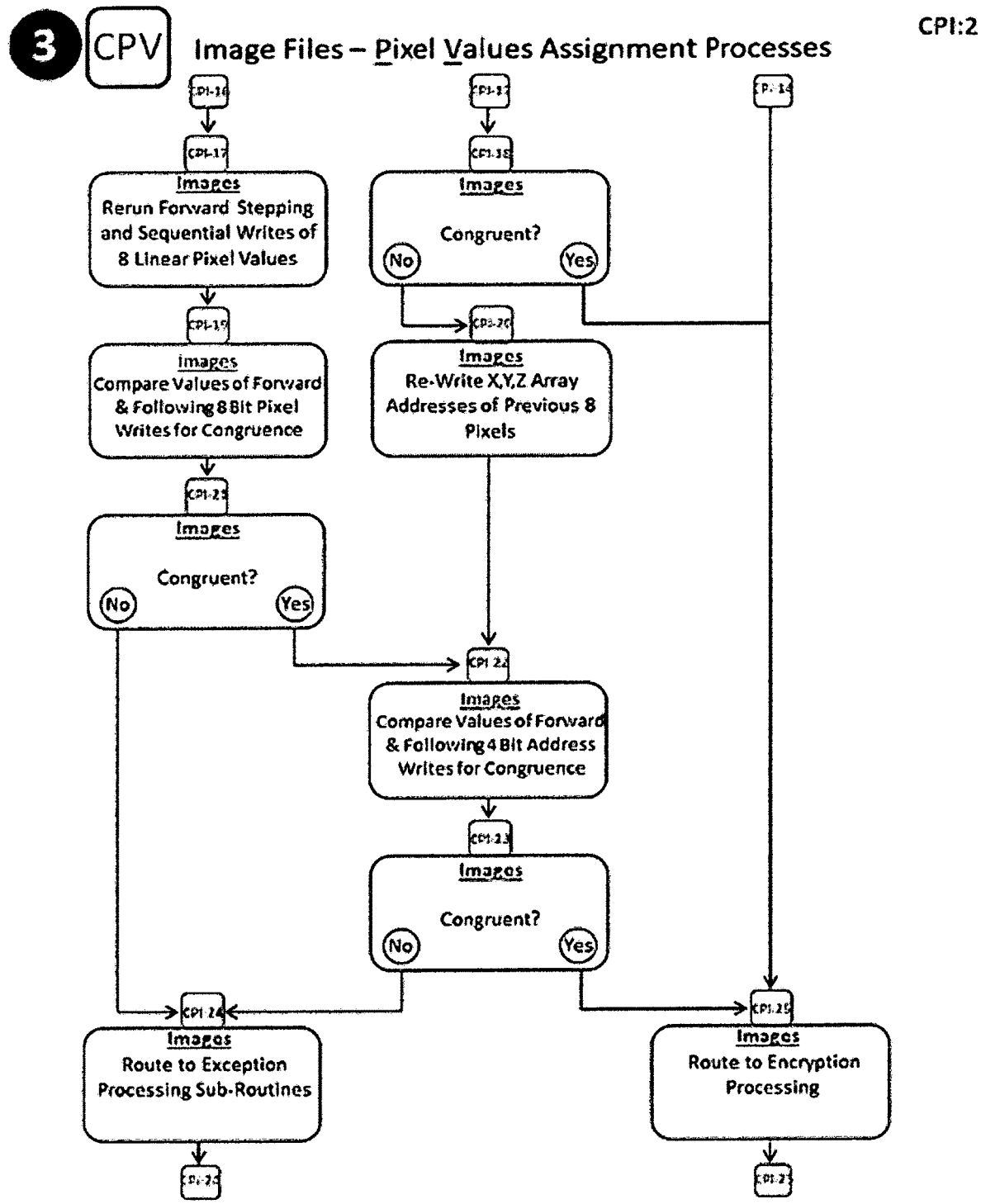
FIG. 26 is an image files—pixel values assignment processes.
Figure 27:
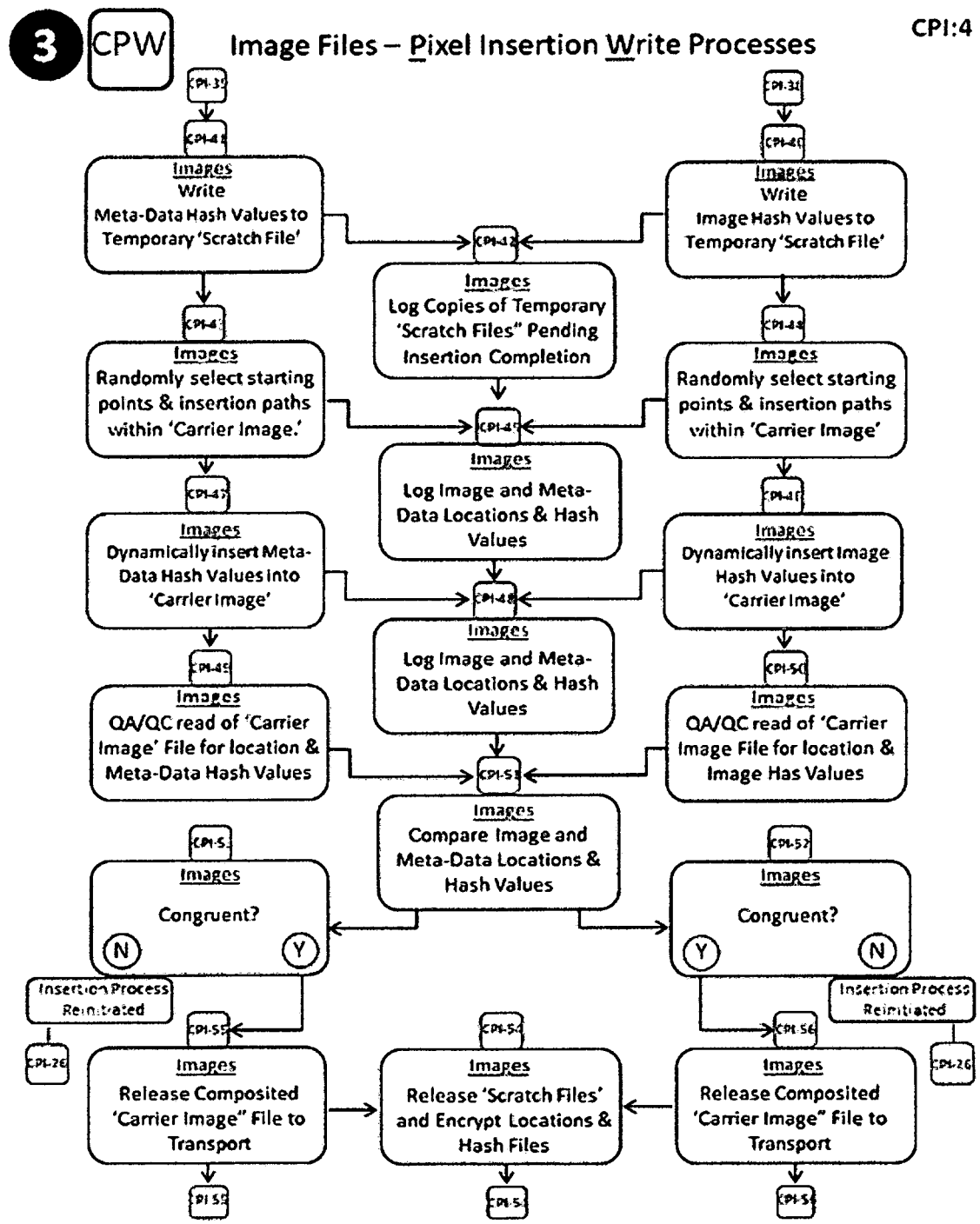
FIG. 27 is an image files—pixel insertion write processes.
Figure 28:
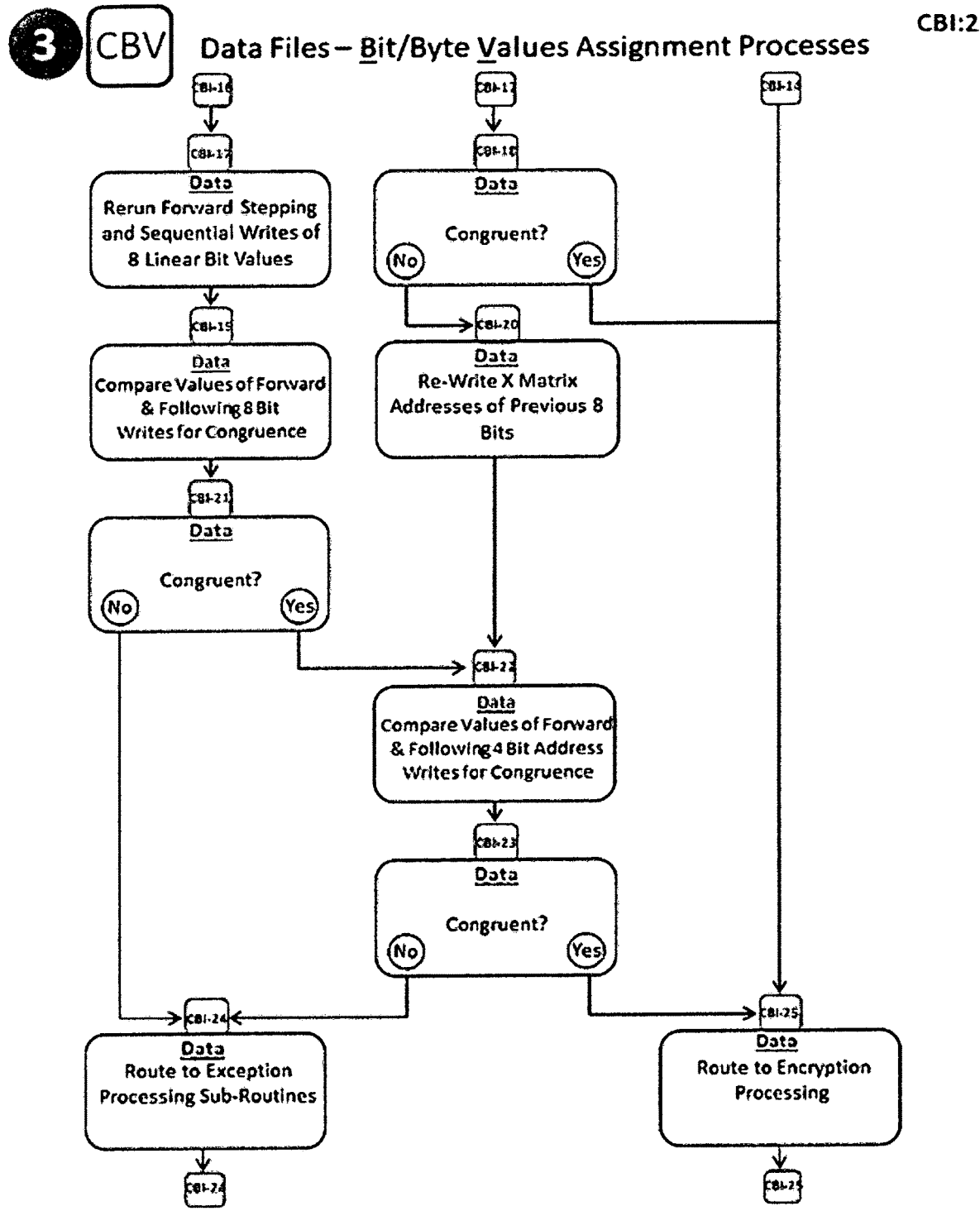
FIG. 28 is a data files—bit/byte values assignment process.
Figure 29:
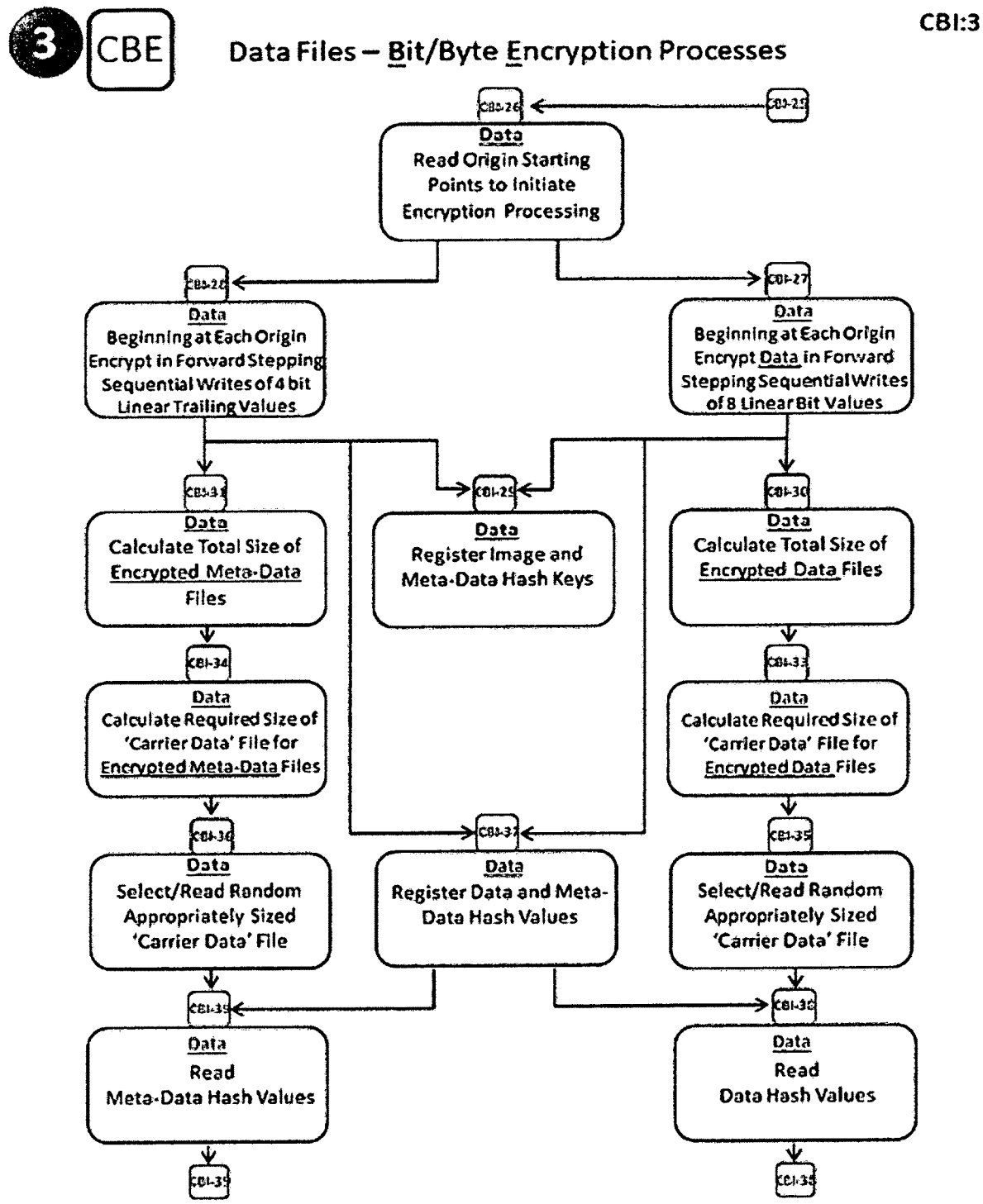
FIG. 29 is a data files—bit/byte encryption processes.
Figure 30:
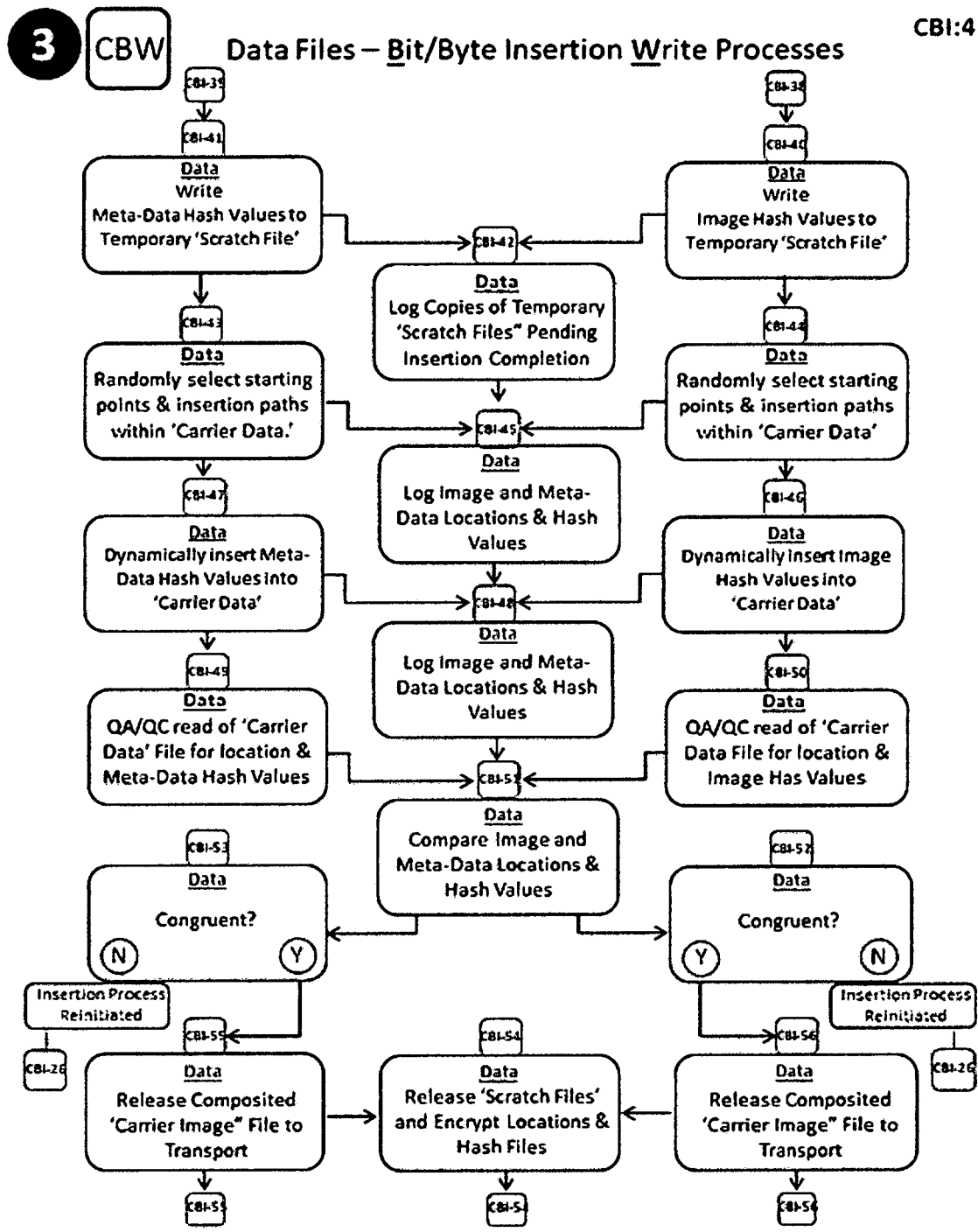
FIG. 30 is a data files—bit/byte insertion write processes.

FIG. 1b illustrates the irregular polygon survey palette. The irregular polygon 201 survey palette creates a uniquely shaped profile for each content payload and metadata package. The system creates a single bit-plane survey palette 201 for alpha-numeric files, and eight separate concentric bit planes 205 for image files. Once the geometry of the polygon is established it is bisected by a line that defines the x axis. A write start point 203 is located at the midpoint of the x-axis and the data stream of the file to be inspected is then written to memory sequentially in a serpentine pattern. Preparatory to inspection, a unique 'dwell angle' 204 is established in degrees relative to the X-axis and a 'stepping path' that originates at the write start point 203. Inspection is initiated at three inspection starting points located at separate points along the stepping path.

Following ingestion of in-bound communications, the file is parsed to separate header information from the corpus of the payload. This is to permit discrete inspection of the inbound traffic. For each, a processor randomly generates an irregularly shaped polygon to format a survey palette 201. For header files and for alpha-numeric files a single X, Y coordinate matrix plane is established 202.

For image files a 3-dimensional X, Y, Z coordinate array consisting of 8 concentric bit planes is established. These bit planes are arranged in order of most to least significant bit from top to bottom 205.

An X-axis is established to bisect each bit plane of each survey palette—i.e. one X-axis line for each layer 205. A data/image write start point is established at the geographic midpoint of each X-axis 203.

Beginning at the data/image write start point 203 and proceeding 'North' along the X-axis the bit/pixel values of the respective files are written sequentially to memory. When the 'boundary' of the survey palette is encountered the process steps one bit/pixel to the right 207—i.e. to the 'East'—and reverses direction to continue the sequential write to memory of bit/pixel values—i.e. to the 'South'. This serpentine write pattern continues until the right—i.e. the 'East'—boundary is encountered, at which time the write process relocates 208 the data/image write start point. The write process steps one bit/pixel to the left—i.e. to the 'West'—and the sequential write process continues until the end of file is identified along the left—i.e. the 'West'—boundary 209.

Once the entire file has been mapped to memory a 'dwell angle' 204 stepping path 210 that bisects the survey palette is randomly generated along which the subsequent inspection processes are oriented.

Table 3 is used to define the terminology used to describe the counter-rotating kernel.

TABLE 3

'Kernel(s)' refer here to the concept of a geometry governing simultaneous reads and/or writes of multiple variables. By illustration, image processing currently and typically employs a 4 × 4 bit matrix. In the case of this system: (i) Data inspection employs a rotated 256 bit matrix, and; (ii) Image inspection employs an array of 8 256 bit matrixes.
'Three Inspection Kernels' refer here to the simultaneous initiation of inspections radiating from each of the three Inspection Starting Points. Two of the Inspection Starting Points are located at boundaries at the opposite end of the Inspection Path and proceed in a single direction. The third inspection consists of a pair of inspections initiated at the Starting Point located at or near the midpoint of the Inspection Path. They and proceed simultaneously in opposite directions along the Inspection Path. As a result the values at each address is read 4 times and reconfirmed 4 times.

The counter-rotating inspection kernel is a concentric pair of 256 bit inspection devices that concurrently read to memory the numerical values of the 255 bits immediately adjacent to the current center points of the inspection kernels. Three inspection kernels are launched at starting points located along the projected inspection path 210 of each bit plane 205. For data files inspection surveys proceed across a single bit plane 201. For image files inspection surveys proceed across each of the eight bit planes that constitute full fidelity visual images. Therefore, for each step in image inspection concurrent surveys are made of: (i) 255 adjacent bits in X, Y dimension, and; (ii) Across each of the eight bit planes in the Z, or vertical dimension.

FIGS. 1C and 1D graphically depicts the forward step and following step components, respectively, of the inspection kernel. The counter-rotating function consists of: (i) clockwise forward stepping reads of numerical values, and; (ii) counter-clockwise following confirming reads.

The inspection process employs a concentric pair of counter rotating inspection kernels. Each kernel is configured: (i) as one bit/pixel 302 of FIG. 1C, oriented and surrounded by 255 adjacent bit/pixel addresses; (ii) where the bit/pixel addresses are located in a contiguous square rotated to a 45 degree offset to the shortest distance across the square, and; (iii) where the order of bearing to the address currently under inspection is established in a opposite spiral pattern for each of the two inspection kernels. Specifically: (i) the layout of the forward stepping inspection kernel originates at the center point of the inspection kernel—i.e. the bit/pixel currently under inspection—and spirals outward in a clockwise pattern 352, and; (ii) the layout of the following stepping inspection kernel originates at the previously re-inspected bit/pixel address and spirals inward in a counter-clockwise pattern 452.

quantization tables, edge detection, corner detection, blob detection, ridge detection and elimination, and affine detection.

FIG. 2A depicts the remote payload in-bound header & payload inspection system.

Table 4 gives the terminology associated with the remote payload in-bound header & payload inspection system.

TABLE 4

'Payloads' refer to an content associated with, carried by, or embedded within electronic communications, including passive forms such as email, data transfers, texts, etc., and active or bidirectional forms such as WEB sessions, mobile applications, etc. 'Image formats' refer to both the type of image-still, video, audio, etc.-and the methods of formatting and encoding.
'Dwell angle' refers the angle in degrees relative the linear write of the data or image file. In this instance the dwell angle is itself randomly generated so as to be unique to the inspection of each file. The selected dwell angle becomes a data element within the package a meta-data that is built to document the inspection process and to communicate to subsequent processes.
'Kernel(s)' refer to the concept of a geometry governing simultaneous reads and/or writes of multiple variables. By illustration, image processing currently and typically employs a 4 × 4 bit matrix. In the case of this system: (i) data inspection employs a rotated 256 bit matrix, and; (ii) image inspection employs an array of eight 256 bit matrixes.

Both the forward stepping and following stepping inspections proceed along the same stepping direction as established along the randomly generated dwell angle.

The increment unit of inspection of bits/pixels under inspection is determined by the type of file being inspected. Specifically, the increment unit for data and metadata inspections can be: (i) advancing increment unit of inspection of 16 preceding and 8 following bits—i.e. three byte increments 309a, 309b, 311a, 311b, and; (ii) following stepping re-inspection unit of inspection is 16 following and 8 advancing bits—i.e. three byte increments.

Image inspections increase the Increment Unit Inspection to 22 to 24 pixels 308, 414.

Each inspection kernel is concurrently metered and guided by: (i) guide bit addresses on the left and right wings of each kernel where the addresses are continuously registered without recording their bit/pixel values 303, 310, and; (ii) the leading the 1 and 0 positions of the forward stepping kernel 301, 304, and the 0 and 1 positions in the following stepping kernel 405, 407. (See FIG. 1D)

The bit/pixel inspection 'table' is a device to: (i) align the stepping process governing the serial progression across the inspection survey; (ii) permit the simultaneous read the numerical values of 256 contiguous bits, and; (iii) concurrently map those values to active memory. Additionally, the four forward stepping alignment points 504a, 504b, 504c, 504d identify the edge—i.e. the border—of the file being inspected.

FIG. 1E depicts the bit/pixel inspection table used in payload inspection. The inspection process employs a bit/pixel inspection 'table' 501 that enables the concurrent read and register the bit/pixel values of the 255 addresses adjacent to the bit/pixel address currently being inspected 502. The values of the adjacent bit/pixels are sequenced and weighted according to the pattern defined by the advancing and following inspection processes. Each sequence of 256 values is conveyed for follow-on inspection algorithms. The system is architected to provision a portfolio of proprietary models and widely employed image processing methods and algorithms within the families of techniques such as array The remote payload in-bound header & payload inspection system is designed to uniquely secure the integrity and safety of in-bound electronic communications, including all headers, content 'payloads', image formats, and data structures.

The above schematic FIG. 2A describes the summary specifications and methods of a system specifically designed to: (i) identify, (ii) isolate, and; (iii) prevent further transmission, admission to internal systems, and execution of so-called 'zero day exploits'—cyber threats not previously identified—carried by, or embedded within in-bound electronic communications of all types and formats. By operating remotely and physically isolated from all internal communications and computing infrastructures the system uniquely provides: (i) immediate identification and protection against new cyber threats, and; (ii) materially enhanced performance and rigor of protection against previously identified threats.

The core function of the system is to identify, verify and isolate the presence of anomalies—i.e. things that do not belong—associated with, or embedded in content carried by electronic communications. Cyber penetration strategies, tactics and forms continually evolve and become progressively more sophisticated. Executable malware code is increasingly parsed, distributed and inserted throughout alpha-numeric content such as email, text and data files, or hidden within images. Such steganographic insertion involves changes in numerical values at the level of: (i) individual bits in the case of alpha-numeric content, and; (ii) individual pixels in the case of image content.

Survey Processes:

The system employs randomly generated non-linear survey patterns. The numerical values of every bit—in the case of alpha-numeric files—and every pixel—in case of image files—are: (i) read; (ii) mathematically transformed by combinations of proprietary and proven public domain algorithms, and recursively compared to the adjacent 254 bits or pixels using an orthogonal set of proprietary algorithms. Each bit or pixel is surveyed a total of six times.

Transformed bit values of data files are plotted—that is, are written sequentially—in a serpentine path across a two dimensional matrix (X, Y) within irregularly shaped polygons produced by randomly generated boundaries. Each survey has a randomly generated: (i) inspection path with a unique 'dwell angle' spanning the inspection polygon, and; (ii) three inspection points of origin.

As pixel images are composited by eight separate bit planes values of image files are plotted in an eight layered array (X, Y, Z) bounded by irregularly shaped three dimensional volumes. The transformed bit values of each bit plane are plotted—that is, are written sequentially—in a serpentine path across a two dimensional matrix (X, Y) within the irregularly shaped polygon of that bit plane. A single randomly generated: (i) inspection path with a unique 'dwell angle' spanning the inspection polygon, and; (ii) three 'inspection points of origin', and applied to each of the eight bit planes to be inspected. (see above and FIG. 1A)

The system employs a unique inspection device consisting of a pair of counter rotating 'kernels' to concurrently read and confirm the read of the transformed numerical values 256 adjacent data or pixel bits. (See above and FIG. 1B) One pair of 'kernels' is launched at each of the three inspection points of origin per survey plane for a total of: (i) three for data file inspections, and; (ii) twenty-four for image file inspections. (See FIG. 2A 601, 602, 603, 604) The data inspection kernel is a two dimensional matrix consisting of 256 read points. The image inspection kernel consists of eight concentrically aligned 256 read point matrixes, or in effect, 256×8 (2048) three dimensional read point array.

The three inspection points of origin are located: (i) two at opposite ends of the inspection path at the boundary of the survey, and; (ii) one at a randomly generated address along the inspection path.

The perimeter kernels step forward in one bit increments in opposite directions. When polygon boundaries are detected each kernel 'sidesteps' eight bits to the left and steps in the return direction along the path parallel to the original inspection path. This process continues until the left boundary is detected and surveyed at which point each kernel returns to respective inspection points of origin. The two kernels then step eight bits to the immediate right and the process is repeated until the entire surface has been surveyed by each kernel.

The third kernel randomly selects which direction along which to step and repeats the serpentine inspection pattern of the other two kernels.

Once launched each inspection (e.g., FIG. 1C or 1D) steps incrementally forward in one bit intervals along the preset inspection path (guided by the dwell angle) while concurrently rotating one bit increment per step. Advancing steps rotate clockwise and read transformed bit values; following steps rotate counterclockwise and confirm the read of the advancing steps. Conforming numerical values are written to memory for comparison to adjacent values. Assay integrity processes:

The system maps the address and retains in memory the transformed numerical values of every bit contained within or composing the file being inspected. This allows the system to: (i) identify and locate the address of potential anomalies; (ii) stochastically verify the presence, location and structure of suspect bit, byte or pixel values; (iii) eliminate false positives; (iv) sequence and link suspect values, and; (v) quarantine defective payloads (see FIG. 1A, 104a, 104b) and isolate identified malware for separate forensic processing.

As they are read into memory, transformed numerical values are recursively evaluated for: (i) continuity; (ii) congruence, and; (iii) 'goodness of fit' with the use of a nested sequence of mathematical algorithms. The evaluation process compares the numerical value of each bit to those of a weighted sample the adjacent 255 bits as encompassed by the geometric shape and dimensions of the inspection kernel (e.g., FIG. 1C or 1D). Certain mathematical and image processing techniques are applied to verify that discontinuous values are not associated with intended changes such as edge conditions, surface gradations, new alpha-numeric characters, etc. 605, 606.

As nominally unexpected numerical values are verified good the histograms are sequentially assembled into provisional: (i) eight bit bytes in the case of alpha-numerical data, or; (ii) eight bit pixels in the case of images 607, 608. Resulting provisional eight bit segments are tested to determine their viability as complete bytes or pixels. If determined not viable (i.e. complete and inclusive) the process steps forward in one bit increments adding one bit in the advancing direction and dropping the last bit in the following direction until provisional bytes or pixels are verified viable.

The histograms of verified viable bytes and pixels are then sequentially assembled into contiguous segments and inspected for: (i) continuity; (ii) congruence, and; (iii) 'goodness of fit' with the use of a nested sequence of mathematical models in a recursive process similar to the previous evaluation at the bit level. Sequences verified good are passed to a 'scratch file' for reassembly into a completed file.

The address, numerical value and transformed histograms of suspected bad bytes or pixels are routed to a separate 'scratch file' where they are compared to the address, numerical values and transformed histograms identified by the other two inspection processes. When two or three of the inspections concur with the identification of suspect bad bytes or pixels, the entire file is routed to an error correction sub-routine and the inspection process is repeated. If following error correction and the second inspection suspect bytes or pixels are confirmed the entire file is routed to quarantine.

For verified good data and image files the numerical values are assembled and routed for packaging and transport. Corresponding histograms are assembled and routed for separate packaging and transport.

The true scope the present invention is not limited to the presently preferred embodiments disclosed herein. For example, the foregoing disclosure of a presently preferred embodiment of the Mycroft payload inspection system uses explanatory terms, such as kernels, tables, and remote inspection and the like, which should not be construed so as to limit the scope of protection of the following claims, or to otherwise imply that the inventive aspects of the Mycroft system are limited to the particular methods and apparatus disclosed. Moreover, as will be understood by those skilled in the art, many of the inventive aspects disclosed herein are based on software applications and operating systems running on generic hardware processing platforms. These functional entities and components in the MyCroft system are, in essence, programmable data collection and processing devices that could take a variety of forms without departing from the inventive concepts disclosed herein. Given the rapidly declining cost and power usage of processors, multi-core processors and other processing hardware, it is easily possible, for example, to include ancillary systems such as the firewall and signature scanning in as components of the MyCroft system or the MyCroft system components could be included into ancillary systems and software without changing the inventive operation of the MyCroft system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

A system for the inspection of digital content in data communications for embedded software coding.

A system for the inspection of digital content in data communications for embedded data.

This narrative describes the combination of invention and first art processes that MyCroft Secured Computing Corporation claims for patent protection. This intellectual property is designed to uniquely secure the integrity and security of in-bound electronic communications, including all content 'payloads', image formats and data structures. Functionally, the claims of invention made here enable systems and services to: (i) Definitively identify and neutralize 'zero-day exploits'—i.e. cyber threats and incursions not seen previously; (ii) Ensure secure transport and transfer of verified 'good' communications, and; (iii) Assure that only known 'good' content is ingested by client communications and computing systems.

Claims Set 1 "Secured Architecture for Content Inspection Processes and Transmission" General Description:

Assured detection and isolation of in-bound cyber threats in general, and 'zero-day' exploits in particular requires processing and communication environments be inert as it relates to content or payload that is inspected. This means the inspection environment itself cannot be compromised by the agents it seeks to identify. Therefore, embedded malware and other anomalies must be definitively prevented from: (i) Executing instructions, or; (ii) Initiating communications within the processing and communication systems, or with external interests. The techniques and methods of maintaining the required inert environment across systems and communications links, and over geographic distance and time are the basis of the patent claims made here.

Processing and Communication 'Bell Jar'

The entire processing and communications topology is a 'bell jar'—meaning that the environment is formed such that: (i) Encompasses—that is entirely surrounds and contains—all systems functions, resources and processes within a single corpus, and is; (ii) Functionally inert to all code—source and object—not native to and registered in the environment.

Disposable 'Processing Containers'

For each inspection individual 'processing containers' are spun up—meaning that the topology is designed such that: (i) Separate, discrete and fully customized inspections are configured, run, verified and discarded; (ii) There is no sharing of resources, physical or virtual including operating system and data; (iii) Assigned resources are released only after results are verified; Upon verification assigned resources are released in a manner to destroy all interim work product, and; (iv) When an anomaly is identified both the synoptic documentation and a replica of the processing container are quarantined in an entirely separate domain and the interim work product and processing destroyed.

The result: Each inspection takes place within its own discrete processing 'bell jar.'

Communications 'Rectifier'

The topology is formed and operates as a 'rectifier'—meaning the structure is designed such that when in-bound traffic and payloads enter the environment: (i) Payloads are decomposed into separated constituent parts; (ii) Content is stripped of an bi-directional capabilities—i.e. independent communication or code execution, and; (iii) Ingested content moves linearly in only one direction.

The result: In-bound communications are rendered inert until headers, formats and content are verified good, and are released.

Secured 'Black-Box' Topology and Operations

The entire topology and the constituent operations within the topology form and operate as a 'black-box' consisting of three entirely segregated domains—production, inspection and testing, development and support—meaning that access to the topology and visibility into its operations is such that: (i) There are no user interfaces, neither for external nor internal interests; (ii) The production system itself underlying processing and communications function autonomously with no direct human oversight and intervention; (iii) Monitoring is initiated when forensics determine quarantined anomalies are caused by processing or communications fault(s); (iv) Diagnosis and remediation occurs in the development domain; (v) Maintenance updates—i.e. code fixes, upgrades, new revisions, etc.—are encrypted and passed to the inspection and testing domain; (vi) New content including code and operating instructions are inspected with no human observation or intervention using the same proprietary algorithms of the inspection service and tested for operating compliance and functional performance, and; (vii) Updates and changes are transferred using proprietary shape shifting networks and reinspected upon receipt for integrity.

The result: Production processing, results and communications, including encryption and network paths, cannot be observed by human beings.

'Shape shifting' topology and configurations The topology and underlying processes are deployed in 'shape shifting' configurations—meaning that processing parameters and communications paths are dynamic such that: (i) Patterns of processing and communications are randomized, and; (ii) Content, including control metadata, is randomly parsed, encrypted, packetized and transported. The result: Should any part of the process be observed—intentionally or inadvertently—subsequent attempts would fail because the 'face'—i.e. shape—of processing continuously changes.

Three Randomized Shapeshifting 'Airgaps'

The topology establishes three airgaps' between recipients from senders or originators of electronic communications—meaning protection is dynamic and layered such that: (i) In-bound content is rendered inert until release as verified good; (ii) Content structures and formats are changed making tracking and comparisons problematic, and (iii) The airgaps themselves are randomized and shape shifting.

The result: Airgap protection is increased by: (i) Number to three; (ii) Expanded beyond jurisdiction and geography to include content reformatting and transmission protocols, and; (iii) Being random and dynamic.

Claims Set 2

"Concurrent Multiple Phase 3-Dimensional Base Element Inspection of Content" General Description:

Identifying the presence and location of anomalies—i.e. "things that don't belong"—within structured and unstructured alpha-numeric data sets and graphic images is required to protect recipients of electronic communications from cyber based exploits. Identifying and isolating threats not seen previously, so called 'zero day' exploits, is the principal function this inspection process. This architecture provisions a set interlaced algorithms that recursively surveys for the presence of values on and below the 'surface' of data sets that either: (i) Demonstrably and inexplicably diverge from adjacent values in the case of two dimensional matrices or 'n' dimensional arrays in the case of data, or; (ii) Demonstrably fail to contribute to the rendering of images.

The inspection processing is based on 3 concurrent scans across the X/Y axis of the 'surface' and 7 adjacent layers in the Z axis of data and image files. Radiating symmetrically radiate from their points of origin each scan inspects each address twice for concurrence. As a result every address is inspected 12 times. The techniques and methods of this recursive scanning and inspection are the basis of the patent claims made here.

'Irregular Polygon' Inspection Map

Once the values of the data/image set are mathematically transformed and rendered into histograms the resulting file size is calculated. Based on the file size and other characteristics an 'irregular polygon' of sufficient address space in X/Y axis, and Z axis if needed is laid out, such that: (i) The file size and other salient characteristics, if any, are accommodated; (ii) The size and shape of the polygon is random; (iii) An azimuth line is randomly drawn across the polygon to establish X/Y axis the file size and is established and the resulting bit or pixel addresses registered; (iv) If appropriate the corresponding 8 layers of the z axis are established and the resulting bit or pixel addresses registered; (v) Three Survey Points of Origin are established on the azimuth line—2 on opposite edges of the polygon (i.e. the shoreline) and the 3rd at a randomly generated midpoint along the azimuth line. The resulting addresses are registered, and; (vi) The geometry of the polygon, the addresses of the azimuth line, and the addresses if the Survey Points of Origin are written to a scratch file with a copy of the scratch file hashed and retained.

The result: A topological map of the content payload is established that is customized, randomized and orthogonal to the original so that the inspection processes do not interact in any way with the objects being inspected. Further, the resulting geometric and bit/pixel address metadata is processed and transmitted separately.

Counter-Rotating Inspection 'Kernel'

Once the polygon, azimuth line and survey origin points have been established the numerical values of the data histogram are linearly written to memory within the boundaries of the polygon. Using a concentric pair of counter-rotating inspection 'kernels' and following separate stepping paths concurrent scans are initiated at each of the three survey origin points such that each pair: (i) Steps forward in one bit/pixel increments; (ii) Reads leading 12 bits/pixels and writes trailing 12 bits/pixels, and; (iii) Upon reaching polygon boundaries the scan returns to the most recent point of departure, steps sideways 1 bit/pixel and the scan process is repeated until all addresses have been inspected.

The result: The numerical value of each bit or pixel address is verified a total of 6 times with confirmed values configured for a staged sequence of integrity analytics.

2×256 Bit/Pixel Inspection 'Kernel'

Each inspection kernel is constructed by combining two 256 bit/pixel matrices—one for the advancing scan, one for trailing or verifying scan. The zero and 256 addresses are aligned with the scan azimuth thereby: (i) Defining the direction of scan, and; (ii) Aligning the kernel to its widest margin of 24 bits/pixels.

The kernel steps forward along the scan azimuth in one bit/pixel increments reading and writing twice—i.e. advancing and trailing scans—the: (i) Numerical value of the center point bit/pixel address plus; (ii) Numerical values of the most adjacent 255 bit/pixel addresses as defined by the geometry of the kernel—such that the numerical values of a broad swath of bits/pixels are confirmed and presented for concurrent stochastic evaluation.

The result: Two dimensional scans of 24 bit/pixel spans: (i) Three 8 bit byte words in the case of data, or; (ii) Three 8 pixel segments in the case of images. This allows concurrent evaluations at both the bit/pixel and byte/fragment levels.

'Spiral Scan' Patterns

Two counter-rotating 'spiral scan' patterns are employed by the kernel to: (i) First identify the addresses and numerical values of the bits/pixels directly adjacent—i.e. bits/pixels tangentially adjacent to the front, back, sides, etc.—to the current center point bit/pixel, and thereafter; (ii) Progressively 'spiraling out' to read second, third, etc. orders of bit/pixel adjacent addresses and numerical values—such that two separately graded 256 bit/pixel maps are formulated by each scan step.

The result: Two copies of the scan map are created where: (i) Bit/pixel addressed and numerical values are congruent, but; (ii) The adjacent values of the scan maps are reciprocals as to distance from the scan center point.

Concurrent 'Three-Dimensional Bit/Pixel Inspection'

Where multiple bit planes are present, such as images, in the Z dimension up to 8 bit planes are inspected concurrently. Bit planes are stacked from 'Most' significant to 'Least' significant bits. Synchronization across the Z axis is established and maintained by: (i) Cross referencing a table of corresponding bit/pixel addresses; (ii) Initiating the scan at each same relative scan point of origin on each bit plane, and; (iii) Programming the scans to follow the same relative scan paths and patterns—such that the two separately graded 256 pit/pixel maps of each bit plane are correlated.

The result: Bit/pixel addresses, numerical values and relative adjacent values at each of the eight bit planes are read, compared, written and correlated to permit concurrent direct access by staged sequences of analytic algorithms to detect numerical anomalies.

Scan 'Alignment and Navigation Plate'

Scan alignment and navigation is established, maintained and communicated with the use of an 'alignment and navigation plate' pointed at: (i) Both the advancing and trailing scan patterns, and; (ii) All bit planes subject to inspection. The 'plate' is configured to conform to the geometry of the inspection kernel with 'alignment points' at the four corners of the plate triangulating with and communicating to and through the central 'inspection point' located in the geometric center of the 'plate' and always pointed at the bit/pixel currently being inspected—such that navigation of each scan is aligned and the outputs are calibrated. The result: The concurrent availability, integrity and ingestion of scan data are assured.

Insertion of randomly generated and randomly located 'Dummy' Pixel images and/or Bit/byte data elements consisting of 'outlier Values' into the inspection bit plane arrays or data matrixes.

During the pixel and bit/byte inspection processes three sets of randomly generated arbitrary and specious values are inserted in randomly selected addresses with in the inspection image arrays or data matrixes. These insertions perform three functions: (i) They provide a benchmark for inspection quality control/quality assurance; (ii) They provide assurance against 'false negative' inspections, and; (iii) As their pixel or bit/byte count increases the checksum parameters by a random, but known factor of the image or data files being inspected the resulting checksum can be used to verify the integrity of the file after transport.

Recursive and Continuous Inspection of In-Bound Electronic Communications Content
Payloads at the Base Level of Individual Pixels, Bits and Bytes" The following processing structures, flows and techniques are claimed on the basis of the principles of a 'Unique Business Process'

Claims Set 4
"Shape Shifting Backhaul Communications Network"
Description and Process Flows in Separate Document.

What is claimed is:

1. A computer implemented method for segregating suspect malware, the computer implemented method comprising:
receiving data having a sequence of data at a proxy for an addressee associated with the received data, wherein the sequence of data has a first sequence, and the sequence of data comprises a plurality of bits;
encrypting the received data and sending the received data to a remote inspection device;
decrypting, by the remote inspection device, the received data;
arranging the received data into an irregular polygon;
generating at least two inspection kernels, the inspection kernels comprising a forward-stepping pattern and a following-stepping pattern;
applying, a first time the at least two inspection kernels to the received data referenced to a first bit that corresponds from irregular polygon to an inspection kernel of the inspection kernels, so that the plurality of bits are arranged in a second sequence different than the first sequence, wherein applying comprises the steps:
a) selecting an origin bit of an inspection kernel selected from the group consisting of the least two inspection kernels, wherein the origin bit of the inspection kernel corresponds a correspondence bit of the irregular polygon, and concatenating the correspondence bit to the second sequence;
b) selecting a second bit of the irregular polygon, and placing the second bit in order with the first bit in the second sequence, based on correspondence of the Inspection kernel to the irregular polygon along an ordered spiral of bits, wherein the second bit corresponds to the second bit in the ordered spiral of bits;
c) repeating steps a and b until a last bit that corresponds from the inspection kernel to the irregular polygon is placed in the second sequence;
and d) applying, at least a second time, the inspection kernel according to a dwell angle, further comprising stepping the inspection kernel relative to the irregular polygon along the dwell angle so that at least one bit of the inspection kernel corresponds to the irregular polygon and repeat steps a, b, c and d by concatenating bits to the second sequence;
processing the second sequence to determine whether malware is detected, and in response to malware detected, quarantining the received data;
and in response to malware not detected, transmitting the received data to the addressee.

2. The computer implemented method of claim 1, wherein for each stepping of the inspection kernel, the inspection kernel is not rotated, but is translated, each bit, and parallel to the dwell angle.

3. The computer implemented method of claim 2, further comprising:
randomly generating the dwell angle.

4. The computer implemented method of claim 3, wherein the dwell angle is not 0°, 90°, 180° or 270° relative to an axis of the irregular pattern.

5. The computer implemented method of claim 1, wherein the origin bit of the inspection kernel that corresponds to the irregular polygon is a perimeter bit of the inspection kernel.

6. The computer implemented method of claim 1, wherein the sequence of data comprises packets, each packet having a header and a payload, wherein receiving the sequence of data further comprises, selecting bits of each header, and encrypting the received data comprises encrypting the bits of each header and decrypting comprises decrypting the bits of each header, and arranging the received data comprises arranging the bits of each header into the irregular polygon.

7. The computer implemented method of claim 1, wherein the sequence of data comprises packets, each packet having a header and a payload, wherein receiving the sequence of data further comprises, selecting bits of each payload, and encrypting the received data comprises encrypting the bits of each payload and decrypting comprises decrypting the bits of each payload, and arranging the received data comprises arranging the bits of each payload into at least two irregular polygons, each corresponding to a significant bit position.

8. The computer implemented method of claim 1, wherein the received data is comprised of bytes and each byte comprises significant bit positions and steps a-d are repeated for each significant bit position, wherein for each significant bit position, the irregular polygon is formed from the significant bit of all bytes of the received data, and in processing the second sequence, the processing the second sequence further comprises processing each of the second sequences to produce a malware estimate for each of the significant bit positions.

9. The computer implemented method of claim 1, wherein the at least two inspection kernels comprise a forward-stepping inspection kernel that comprises a forward-stepping origin bit and a forward-stepping ordered spiral of bits that spiral outwards from the origin bit that forms the order;
and a following-stepping inspection kernel that comprises a following-stepping origin bit at a perimeter of the following-stepping inspection kernel and a following-stepping ordered spiral of bits that spiral inwards from the origin bit that forms the order.

10. The computer implemented method of claim 1, wherein processing the second sequence to determine whether malware is detected further comprises:
using an anomaly identifier to establish a malware estimate;
determining if the malware estimate exceeds a threshold;
in response to the malware estimate exceeding the threshold, quarantining the received data;
and in response to the malware estimate not exceeding the threshold, transmitting the received data to the addressee.

11. The computer implemented method of claim 1, wherein arranging the received data into an irregular polygon further comprises:
establishing a geometry of the irregular polygon;
forming a write start point by bisecting the irregular polygon and selecting a midpoint along a line bisecting the irregular polygon to be the write start point, wherein the irregular polygon is a two-dimensional array of non-uniform rows, and wherein the write start point is an array location;

writing the received data in successive array locations in a serpentine pattern.

12. The computer implemented method of claim 11, wherein writing the received data in successive array locations in the serpentine pattern further comprises:
   filling the array with data until all array locations in a direction of the irregular polygon are filled, and in response, resuming filling the array with data from an array location adjacent the write start point and in a direction different from the direction.

* * * * *